United States Patent
Branscomb et al.

(10) Patent No.: US 9,067,154 B1
(45) Date of Patent: Jun. 30, 2015

(54) REPLACEMENT FILTER CARTRIDGE

(71) Applicant: 3M INNOVATIVE PROPERTIES COMPANY, St. Paul, MN (US)

(72) Inventors: Matt R. Branscomb, Lakeville, MN (US); Jeffrey M. Maki, Inver Grove Heights, MN (US); Jeremy A. Schmoll, Pine Island, MN (US); Jon P. Kragness, Farmington, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/635,712

(22) Filed: Mar. 2, 2015

Related U.S. Application Data

(60) Provisional application No. 62/076,409, filed on Nov. 6, 2014.

(51) Int. Cl.
*B01D 27/08* (2006.01)
*B01D 46/00* (2006.01)
*B01D 35/30* (2006.01)

(52) U.S. Cl.
CPC ............ *B01D 27/08* (2013.01); *B01D 46/0005* (2013.01); *B01D 35/306* (2013.01); *B01D 2201/4061* (2013.01); *B01D 2201/4007* (2013.01); *B01D 2201/52* (2013.01)

(58) Field of Classification Search
None
See application file for complete search history.

(56) References Cited

U.S. PATENT DOCUMENTS

| | | | |
|---|---|---|---|
| 3,746,171 A | 7/1973 | Thomsen | |
| 4,077,876 A | 3/1978 | Southall | |
| 4,082,673 A | 4/1978 | Cilento | |
| 4,461,394 A | 7/1984 | Sendel et al. | |
| 4,515,692 A | 5/1985 | Chandler et al. | |
| 4,735,716 A | 4/1988 | Petrucci et al. | |
| 4,836,584 A | 6/1989 | Baker | |
| 4,877,521 A | 10/1989 | Petrucci et al. | |
| 4,915,831 A | 4/1990 | Taylor | |
| 5,013,434 A | 5/1991 | Furrow | |
| 5,114,572 A | 5/1992 | Hunter et al. | |
| 5,132,009 A | 7/1992 | Futa et al. | |
| 5,215,655 A | 6/1993 | Mittermaier | |
| 5,269,919 A | 12/1993 | Von Medlin | |

(Continued)

FOREIGN PATENT DOCUMENTS

| | | |
|---|---|---|
| DE | 19905601 | 8/2000 |
| GB | 2333247 | 7/1999 |

(Continued)

*Primary Examiner* — Benjamin Kurtz
(74) *Attorney, Agent, or Firm* — Fish & Richardson P.C.

(57) ABSTRACT

The subject matter of this specification can be embodied in, among other things, a filter replacement kit that includes a filter cartridge. The filter cartridge includes a filter body, a filter media disposed within the filter body, a neck portion having a fluid inlet and a fluid outlet, and a cartridge engagement mechanism on the neck portion for engaging a manifold assembly. The cartridge engagement mechanism includes at least one filter engagement surface. The filter replacement kit also includes compatibility indicia indicating that the filter cartridge is compatible with at least one appliance. The at least one appliance includes the manifold assembly including a manifold engagement mechanism having a manifold engagement surface with first and second horizontal portions, and an angled portion disposed between and joining the first horizontal portion to the second horizontal portion, wherein the filter engagement surface is non-congruent to the manifold engagement surface.

23 Claims, 28 Drawing Sheets

(56) References Cited

U.S. PATENT DOCUMENTS

| | | |
|---|---|---|
| 5,302,284 A | 4/1994 | Zeiner et al. |
| 5,336,406 A | 8/1994 | Stanford et al. |
| 5,486,288 A | 1/1996 | Stanford et al. |
| 5,548,893 A | 8/1996 | Koelfgen |
| 5,591,332 A | 1/1997 | Reid et al. |
| 5,753,107 A | 5/1998 | Magnusson et al. |
| 6,027,644 A | 2/2000 | Magnusson et al. |
| 6,099,735 A | 8/2000 | Kelada |
| 6,193,884 B1 | 2/2001 | Magnusson et al. |
| 6,360,764 B1 | 3/2002 | Fritze |
| 7,481,928 B2 | 1/2009 | Fritze |
| 7,799,220 B2 | 9/2010 | Fritze |
| 8,182,699 B2 | 5/2012 | Fritze |
| 2003/0019819 A1 | 1/2003 | Fritze |
| 2004/0050772 A1* | 3/2004 | Winter et al. ............... 210/483 |
| 2004/0094468 A1 | 5/2004 | Fritze |
| 2004/0251192 A1 | 12/2004 | Fritze et al. |
| 2009/0101554 A1* | 4/2009 | Kreiner et al. ........... 210/167.08 |
| 2011/0005988 A1* | 1/2011 | Bassett et al. ............. 210/232 |

FOREIGN PATENT DOCUMENTS

| | | |
|---|---|---|
| WO | 03/011425 | 2/2003 |
| WO | 2005/099862 | 10/2005 |

* cited by examiner

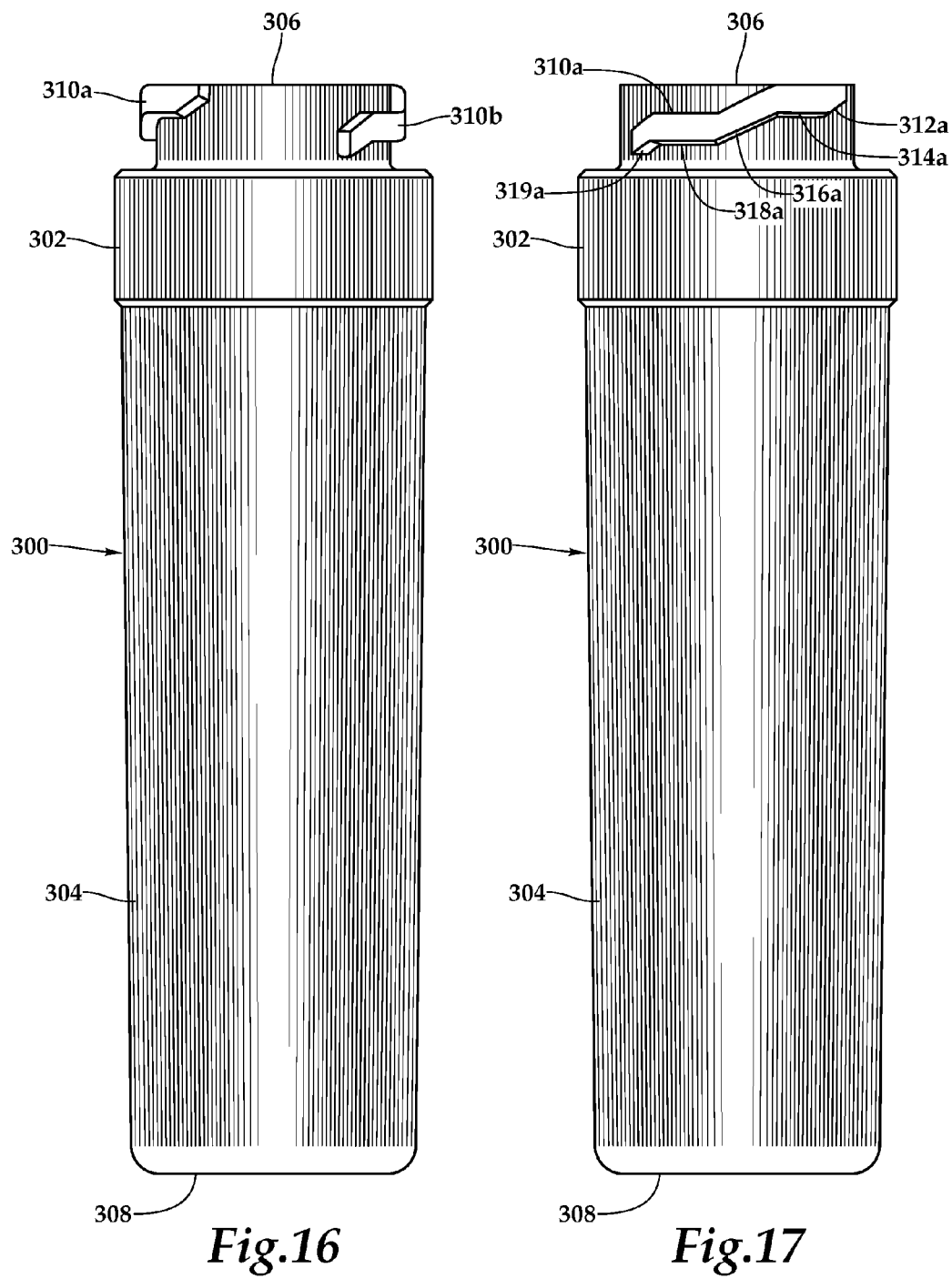

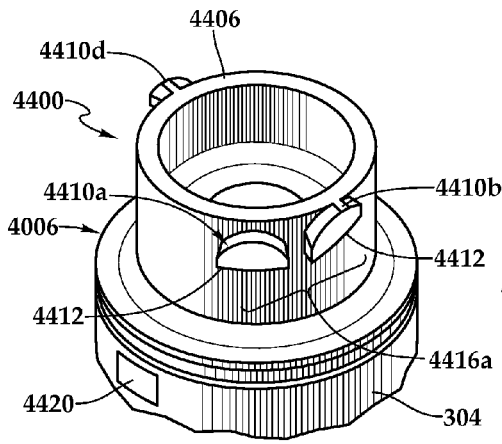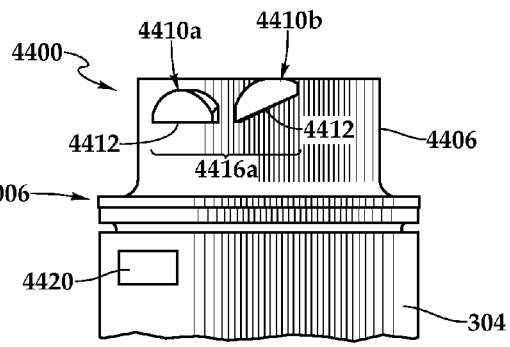
*Fig.44A*     *Fig.44B*
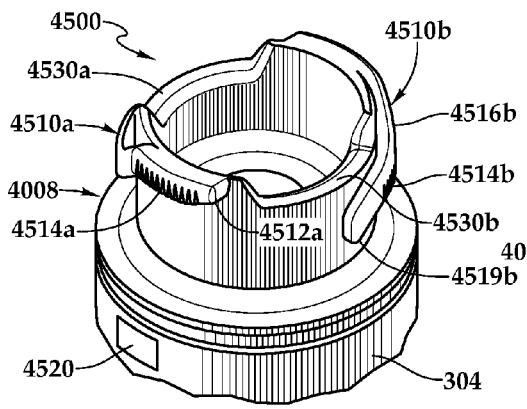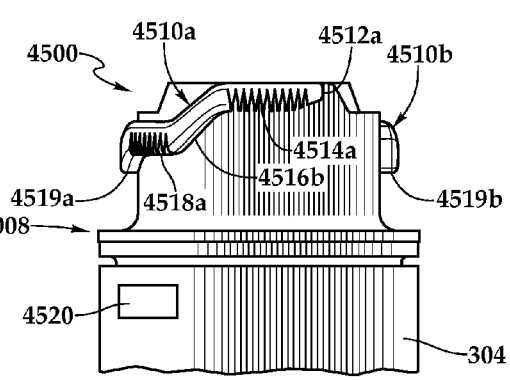
*Fig.45A*     *Fig.45B*
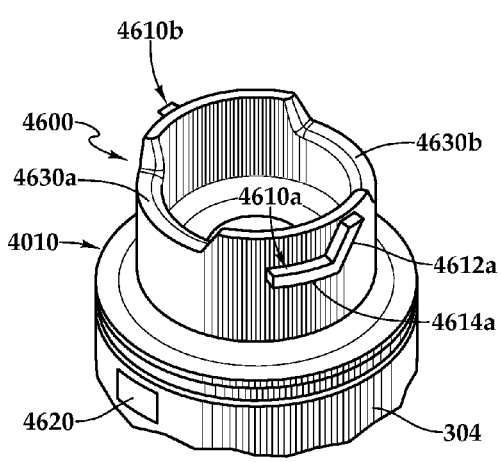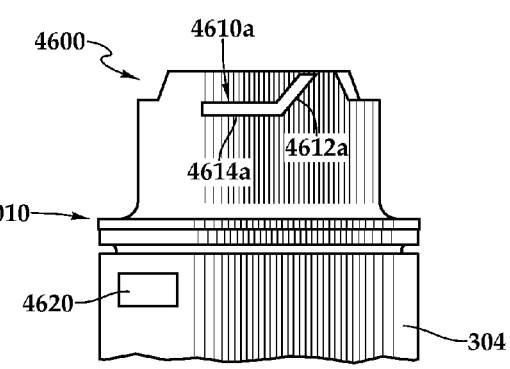
*Fig.46A*     *Fig.46B*

REPLACEMENT FILTER CARTRIDGE

CROSS REFERENCE TO RELATED APPLICATIONS

This application claims the benefit of U.S. Provisional Application Ser. No. 62/076,409, filed Nov. 6, 2014, the content of which is incorporated herein by reference in its entirety.

TECHNICAL FIELD

This instant specification relates to filter assemblies.

BACKGROUND

The present disclosure relates generally to the field of residential and commercial filtration products, such as water filtration products. The filter assemblies can be used to filter any one of a range of fluids, such as water, oil, biological preparations, beer, wine, other beverages, other consumable liquids and the like. For convenience, the discussion below focuses on water filtration, although the filter assemblies can generally be used for other applications based on the disclosure herein.

Water filter assemblies, such as point-of-use water filtration systems have become increasingly common in the residential and commercial environment. There are many advantages to these types of systems in addition to the improvements to taste and appearance of the water. In situations where the source water has been municipally treated, point-of-use systems allow the water to retain the disinfecting properties imparted by the municipality until the moment of use such that chances of undesirable microbial contamination is correspondingly reduced. These point-of-use filtration systems can also be individually tailored to treat specific properties of the source water.

One disadvantage of point-of-use filtration systems in the residential and commercial environment is that they must be designed to fit in the limited spaces available to house the systems in these markets. As the design must be compact and unobtrusive, these systems must be designed to allow for frequent and easy replacement of used and exhausted filter elements. Because many of the users in the commercial and residential market may be unfamiliar with the potential dangers of working with a pressurized system, the filtration systems must also be designed with the safety of the user in mind.

To that end, during normal operation of the filters utilized in the point-of-use water filtration systems, the potential for self uncoupling, i.e., disconnection without user intervention, of the filter cartridge from the filter manifold should be eliminated to prevent unwanted leakage and subsequent disengagement of the filter assembly while also permitting the assembly to disconnect safely should an increased pressure condition occur beyond the structural failure point of the filter assembly. Further, the act of uncoupling the filter cartridge utilized in the point-of-use water filtration systems from the filter manifold utilized in the system should also permit the relief of any excess pressure in a controlled manner to reduce the risk of damage or personal injury to the point-of-use water filtration system user.

SUMMARY

In general, this document describes replacement filter assemblies.

In a first aspect, a filter replacement kit includes a filter cartridge. The filter cartridge includes a filter body, a filter media disposed within the filter body, a neck portion having a fluid inlet and a fluid outlet, and a cartridge engagement mechanism on the neck portion for engaging a manifold assembly, the cartridge engagement mechanism including at least one filter engagement surface. The filter replacement kit also includes compatibility indicia, wherein the compatibility indicia indicates that the filter cartridge is compatible with at least one appliance. The at least one appliance includes the manifold assembly including a manifold engagement mechanism having a manifold engagement surface with a first horizontal portion, a second horizontal portion, and an angled portion disposed between and joining the first horizontal portion to the second horizontal portion, and wherein the filter engagement surface is non-congruent to the manifold engagement surface.

Various embodiments can include some, all, or none of the following features. The filter engagement surface may not include a first filter horizontal portion, a second filter horizontal portion and an angled filter portion disposed between and joining the first filter horizontal portion to the second filter horizontal portion. The at least one filter engagement surface can include first and second filter engagement surfaces on generally opposite sides of the neck portion, wherein the first filter engagement surface may include no more than one horizontal portion. The at least one filter engagement surface can include first and second filter engagement surfaces on generally opposite sides of the neck portion, wherein the first filter engagement surface may include no more than one horizontal portion and an angled portion. The filter engagement surface can include an arcuate portion. The filter engagement surface can include two separated arcuate surfaces extending from an outer surface of the neck portion and disposed within 180 degrees of rotation on the outer surface, wherein the two arcuate surfaces may be spaced axially and circumferentially apart from each other with respect to a centerline axis of the filter cartridge extending in a longitudinal direction. The filter engagement surface can include two posts. The filter engagement surface can include two arcs. The filter engagement surface can include two separated tabs on an outer surface of the neck portion disposed within 180 degrees of rotation on the outer surface and the two separated tabs can be spaced axially and circumferentially apart from each other with respect to a centerline axis of the filter cartridge extending in a longitudinal direction. The at least one appliance can be a refrigerator manufactured by Electrolux, GE, Haier, or Bosch with the manifold assembly.

In a second aspect, a filter replacement kit includes a replacement filter cartridge. The replacement filter cartridge includes a filter body, a filter media disposed within the filter body, a neck portion having a fluid inlet and a fluid outlet, and a cartridge engagement mechanism on the neck portion for engaging a manifold assembly, the cartridge engagement mechanism comprising at least one filter engagement surface, and compatibility indicia, wherein the compatibility indicia indicates that the replacement filter cartridge is a compatible replacement for at least one replaceable filter cartridge. The at least one replaceable filter cartridge includes a replaceable filter engagement mechanism having a replaceable filter engagement surface with a first horizontal portion, a second horizontal portion, and an angled portion disposed between and joining the first horizontal portion to the second horizontal portion, and the filter engagement surface is non-congruent to the replaceable filter engagement surface.

Various embodiments can include some, all, or none of the following features. The filter engagement surface may not include a first filter horizontal portion, a second filter horizontal portion and an angled filter portion disposed between and joining the first filter horizontal portion to the second filter horizontal portion. The at least one filter engagement surface can include first and second filter engagement surfaces on generally opposite sides of the neck portion, wherein the first filter engagement surface may include no more than one horizontal portion. The at least one filter engagement surface can include first and second filter engagement surfaces on generally opposite sides of the neck portion, wherein the first filter engagement surface can include no more than one horizontal portion and an angled portion. The filter engagement surface can include an arcuate portion. The filter engagement surface can include two separated arcuate surfaces extending from an outer surface of the neck portion and disposed within 180 degrees of rotation on the outer surface, wherein the two arcuate surfaces may be spaced axially and circumferentially apart from each other with respect to a centerline axis of the filter cartridge extending in a longitudinal direction. The filter engagement surface can include two posts. The filter engagement surface can include two arcs. The filter engagement surface can include two separated tabs on an outer surface of the neck portion disposed within 180 degrees of rotation on the outer surface and the two separated tabs can be spaced axially and circumferentially apart from each other with respect to a centerline axis of the filter cartridge extending in a longitudinal direction. The at least one replaceable filter cartridge can be a replaceable filter cartridge having a model identifier selected from the group consisting of EPTWFU01, EWF02, MSWF, 60218743, 9000 674655, 4US-MAXL-F01 & 4US-MAXS-F01, 4US-RO-POST, 4US-RO-POSTH, 4WH-QCTO-F01, 4WH-QS-F01, and 4WH-QSS-F01H.

In a third aspect, a method of replacing a filter cartridge includes removing a replaceable filter cartridge from a manifold assembly, wherein the manifold assembly comprising a manifold engagement mechanism having a manifold engagement surface with a first horizontal portion, a second horizontal portion, and an angled portion disposed between and joining the first horizontal portion to the second horizontal portion, inserting a replacement filter cartridge into the manifold assembly, wherein the replacement filter cartridge comprises a replacement cartridge engagement mechanism comprising a replacement cartridge engagement surface that is non-congruent to the manifold engagement surface and turning the replacement filter cartridge to engage the filter engagement surface with the manifold engagement surface.

Various implementations can include some, all, or none of the following features. The replaceable filter cartridge can include a replaceable filter engagement mechanism with a replaceable filter engagement surface that is congruent to the manifold engagement surface. The method can also include sliding the filter engagement surface against the second horizontal portion, sliding the filter engagement surface against the angled portion after sliding the filter engagement surface against the second horizontal portion, and sliding the filter engagement surface against the first horizontal portion after sliding the filter engagement surface against the angled portion.

In a fourth aspect a filter cartridge includes a filter body, a filter media disposed within the filter body, and a neck portion having a fluid inlet and a fluid outlet. A cartridge engagement mechanism on the neck portion is configured for engaging a manifold assembly with a manifold attachment member comprising a manifold engagement surface comprising a first horizontal portion, a second horizontal portion, and an angled portion disposed between and joining the first horizontal portion to the second horizontal portion. The cartridge engagement mechanism includes a filter engagement surface that is non-congruent with the manifold engagement surface.

Various embodiments can include some, all, or none of the following features. The cartridge engagement mechanism on the neck portion can be configured for engaging at least one manifold assembly having a model identifier selected from the group including PureSource Ultra II-M, PureSource Ultra II-U, PureAdvantage Ultra-M, PureAdvantage Ultra-U, GE MSWF, 60820860, 9000 225170, 9000 705475, 9000 777508, 4US-MAXL-S01, 4US-MAXS-S01, 4US-RO-S01, 4US-RO-S01H, 4WH-Q Series, 4WH-QS-S01, 4WH-QCTO-S01, and 4WH-QSS-S01H.

In a fifth aspect, a filter cartridge includes a filter body, a filter media disposed within the filter body, and a neck portion having a fluid inlet and a fluid outlet. A cartridge engagement mechanism on the neck portion includes a means for engaging a compatible manifold assembly with a manifold attachment member comprising a manifold engagement surface comprising a first horizontal portion, a second horizontal portion, and an angled portion disposed between and joining the first horizontal portion to the second horizontal portion.

Various embodiments can include some, all, or none of the following features. The means for engaging a compatible manifold assembly can include a filter engagement surface that is non-congruent with the manifold engagement surface.

In a sixth aspect, a system includes a manifold assembly including a manifold engagement mechanism having a manifold engagement surface with a first horizontal portion, a second horizontal portion, and an angled portion disposed between and joining the first horizontal portion to the second horizontal portion, and a replacement filter cartridge including a filter body, a filter media disposed within the filter body, a neck portion having a fluid inlet and a fluid outlet, and a cartridge engagement mechanism for engaging the manifold assembly, the cartridge engagement mechanism comprising at least one a filter engagement surface. The replacement filter cartridge is attached to the manifold assembly with the filter engagement surface engaged with the manifold engagement surface and wherein the filter engagement surface is non-congruent to the manifold engagement surface.

Various embodiments can include some, all, or none of the following features. The filter engagement surface may not include a first filter horizontal portion, a second filter horizontal portion and an angled filter portion disposed between and joining the first filter horizontal portion to the second filter horizontal portion. The at least one filter engagement surface can include first and second filter engagement surfaces on generally opposite sides of the neck portion, wherein the first filter engagement surface can include no more than one horizontal portion. The at least one filter engagement surface includes first and second filter engagement surfaces on generally opposite sides of the neck portion, wherein the first filter engagement surface includes no more than one horizontal portion and an angled portion. The filter engagement surface can includes an arcuate portion. The filter engagement surface can include two separated arcuate surfaces extending from an outer surface of the neck portion and disposed within 180 degrees of rotation on the outer surface, wherein the two arcuate surfaces are spaced axially and circumferentially apart from each other with respect to a centerline axis of the filter cartridge extending in a longitudinal direction. The filter engagement surface can include two posts. The filter engagement surface can include two arcs. The filter engagement surface can include two separated tabs on an outer surface of the neck portion disposed within 180 degrees of rotation on the outer surface and the two separated tabs can be spaced axially and circumferentially apart from each other with respect to a centerline axis of the filter cartridge extending in a longitudinal direction. The manifold assembly can be a manifold assembly having a model identifier selected from the group consisting of PureSource Ultra II-M, PureSource Ultra II-U, PureAdvantage Ultra-M, PureAdvantage Ultra-U, GE MSWF, 60820860, 9000 225170, 9000 705475, 9000 777508, 4US-MAXL-S01, 4US-MAXS-S01, 4US-RO-S01, 4US-RO-S01H, 4WH-Q Series, 4WH-QS-S01, 4WH-QCTO-S01, and 4WH-QSS-S01H.

The systems and techniques described here may provide one or more of the following advantages. First, a system can provide a filter cartridge assembly that is easily removed and replaced by an end-user. The system can provide filter engagement features that can engage with a number of different models of filter manifolds and appliance models. The system can provide a number of different configurations of engagement features that can compatibly engage with filter manifolds having two-stage engagement and disengagement features.

The details of one or more implementations are set forth in the accompanying drawings and the description below. Other features and advantages will be apparent from the description and drawings, and from the claims.

DESCRIPTION OF DRAWINGS

FIG. 16 is a side view of the filter cartridge of FIG. 13.

FIG. 17 is an alternative side view of the filter cartridge of FIG. 13.

FIG. 44A is a fragmentary perspective view of an embodiment of the filter cartridge of FIG. 13 with an expanded view of another example filter cap.

FIG. 44B is a fragmentary side view of an embodiment of the filter cartridge of FIG. 13 with an expanded view of the filter cap of FIG. 44A.

FIG. 45A is a fragmentary perspective view of an embodiment of the filter cartridge of FIG. 13 with an expanded view of another example filter cap.

FIG. 45B is a fragmentary side view of an embodiment of the filter cartridge of FIG. 13 with an expanded view of the filter cap of FIG. 45A.

FIG. 46A is a fragmentary perspective view of an embodiment of the filter cartridge of FIG. 13 with an expanded view of another example filter cap.

FIG. 46B is a fragmentary side view of an embodiment of the filter cartridge of FIG. 13 with an expanded view of the filter cap of FIG. 46A.

DETAILED DESCRIPTION

Figure 1:
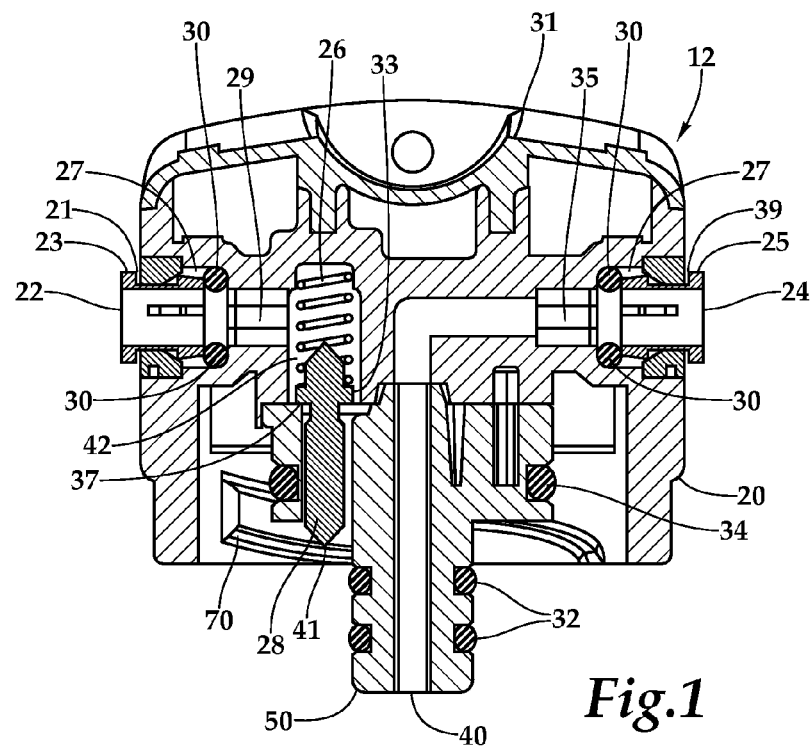
FIG. 1 is a sectional view of the manifold assembly member of the present disclosure taken through the inlet and outlet ports.
Figure 2:
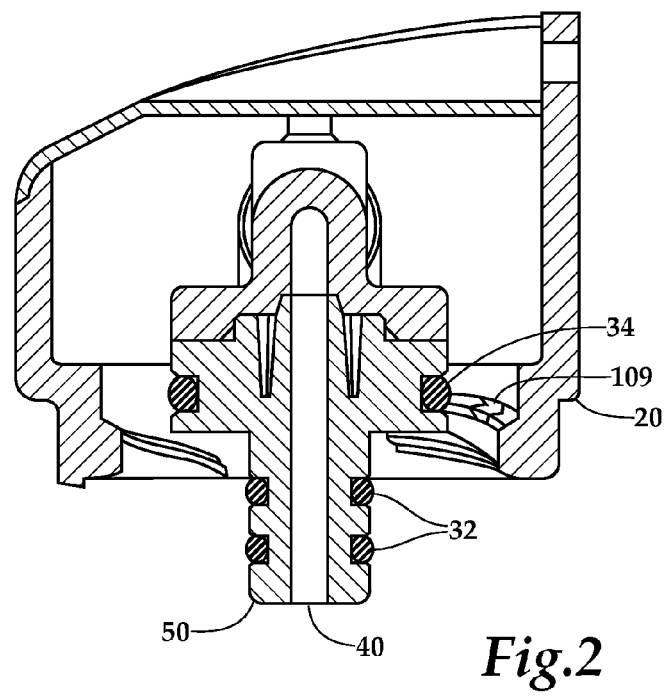
FIG. 2 is a sectional view of the manifold assembly member of the present disclosure taken perpendicular to FIG. 1.

An example filter assembly or point-of-use water filtration system of the present disclosure is shown generally at 10 in the figures. The filter assembly 10 includes two major components: a manifold assembly 12 and a cartridge assembly 14. The cartridge assembly 14 includes three major subcomponents: a cartridge top member 16, a cartridge housing 18, and a filter element 19.

As illustrated in FIGS. 1, 2, 3, and 4, the manifold assembly 12 includes a manifold assembly body 20. An inlet cartridge fitting 23 is press-fit into an inlet bore 21 of the manifold assembly body 20, forming an inlet port 22. A gap 27, illustrated in FIG. 1, is formed between the inlet bore 21 and the inlet cartridge fitting 23. The inlet port 22 is sealed from a gap 27 by means of an O-ring 30 or the like. The inlet port 22 narrows into a tubular inlet flow passage 29. The inlet flow passage 29 leads to a valve well 42. The valve well 42 is positioned to accept both a high-flow valve 28 and a biasing spring 26. The valve well 42 is fluidly operatively connected to an inlet bore 52 of a cartridge insert 50 (see FIG. 3). The high-flow valve 28 is seated in and also longitudinally translates within the valve well 42. The inlet bore 52 has an annular surface 37 upon which a ridge 33 of the high-flow valve 28 sits to create a substantially water-tight seal when the biasing spring 26 is decompressed.

Figure 3:
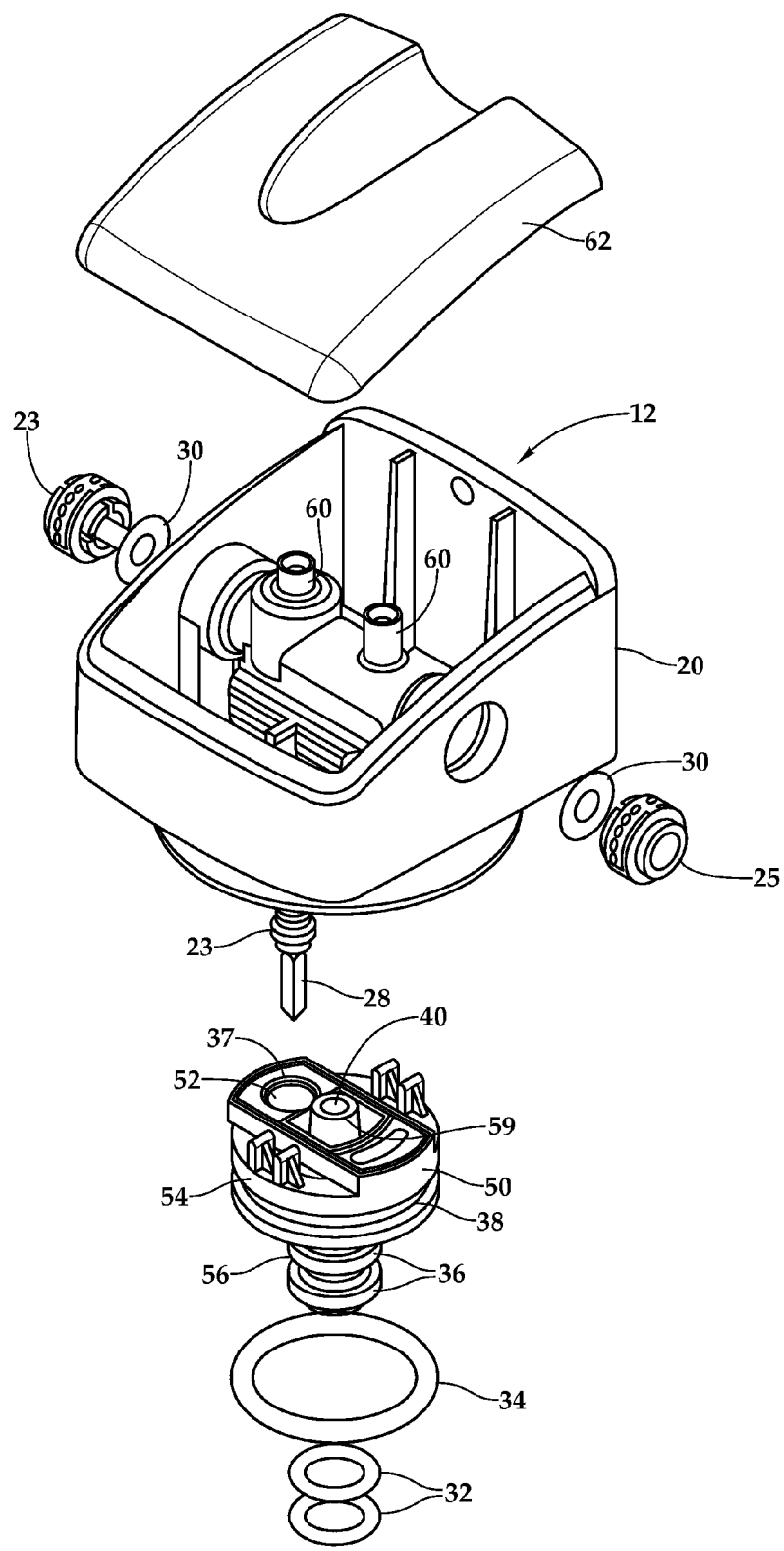
FIG. 3 is an exploded perspective view of the manifold assembly.
Figure 4:
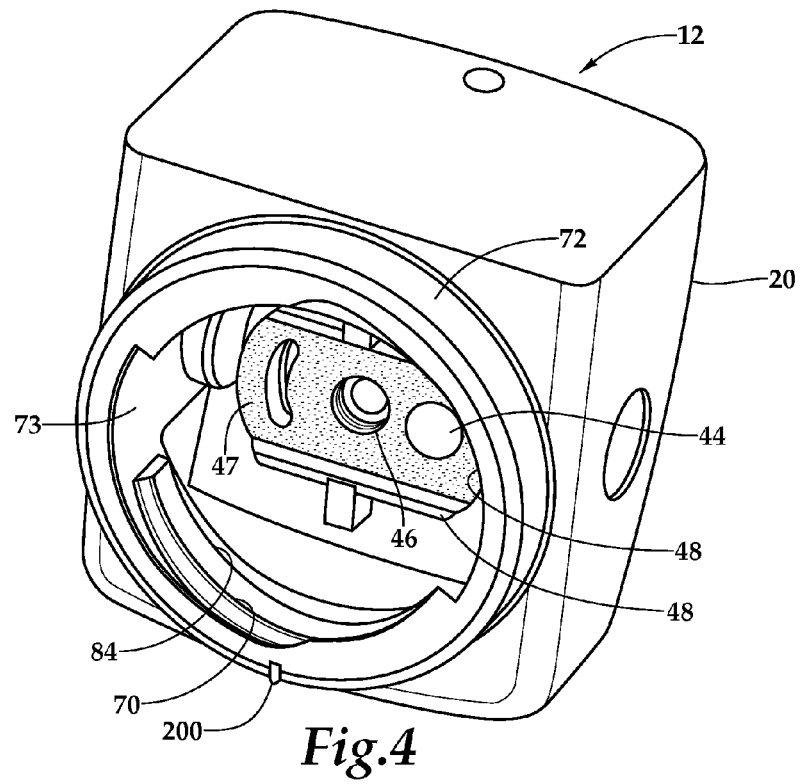
FIG. 4 is an underside perspective view of the manifold assembly.
Figure 5:
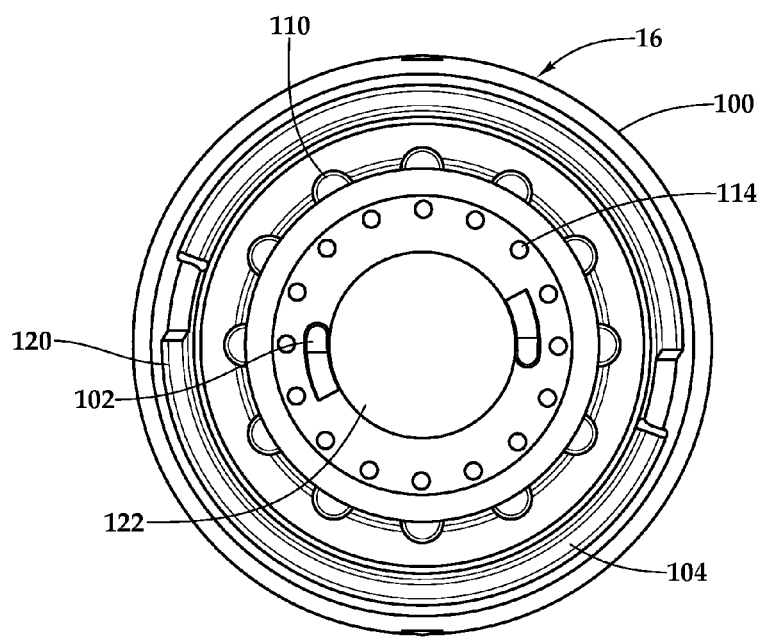
FIG. 5 is a plan view of the cartridge top member.

From FIG. 3, the cartridge insert 50 has two main sections, an expanded upper body portion 54 and a second reduced body portion 56. The body portion 56 has a significantly reduced diameter when compared to the diameter of an upper body portion 54. The cartridge insert 50 is fixedly operatively connected to a base assembly 43 of the manifold assembly 12 at a sealing surface 47, as shown in FIG. 4. The cartridge insert 50 and the base assembly 43 are substantially sealed therein by a gasket 48 or the like, which separates pressurized inlet and outlet water from the cavity of the manifold assembly body 20. The base assembly 43 is operatively connected with the cartridge insert 50 and fluidly connects an outlet 44 of the manifold assembly 20 with and inlet bore 52 of the cartridge insert 50, as well as an inlet 46 of the manifold assembly 20 with an outlet bore 40 of the cartridge insert 50.

An expanded upper body portion 54 includes a groove 38. The groove 38 includes a seal 34, such as an O-ring, for substantially sealing pressurized water from within a receiver well 106 of the cartridge top member 16 (shown in FIG. 6 and described below) from the cavity of the manifold assembly body 20. The reduced body portion 56 also includes a pair of grooves 36. The grooves 36 are arranged in series and hold a collection of seals 32, such as O-rings, to separate unfiltered inlet water within the receiver well 106 from filtered outlet water. The reduced body portion 56 also has bored through its longitudinal center an outlet bore 40 for conveying filtered outlet water from the cartridge assembly 14.

Turning now to FIG. 3, the outlet bore 40 continues through the expanded upper body portion 54 by means of a conical projection 59 within which filtered outlet water flows. The conical projection 59 has a wider diameter at its base than its peak, the base therefore narrowing to its point of fluid coupling with an outlet flow passage 31. The outlet bore 40 retains a substantially constant inside diameter flow path. From FIG. 1, the flow passage 31 has an approximate 90-degree turn leading to an outlet flow passage 35. As before, the outlet port 24 is formed from the press-fitting of the outlet cartridge fitting 25 into the outlet bore 39 of the manifold assembly body 20. A similar sealing means of an O-ring 30 is employed to seal the subsequent gap 27 formed between the outlet cartridge fitting 25 and the outlet bore 39.

The manifold assembly 12 also includes a top manifold hood 62 attached to the manifold assembly body 20 using a collection of manifold hood connectors 60 as shown in FIG. 3.

Referring to FIG. 4, the underside of the manifold assembly body 20 has protruding therefrom a cartridge receiver 72 for operatively connecting with the cartridge top member 16. The operatively connecting mechanism between the cartridge receiver 72 and the cartridge top member 16 is through a collection of interior helical tabs 70 located on the inside margin 73 of the cartridge receiver 72. The tabs 70 are diametrically opposed on the inside margin 73. The tabs 70 extend flush from the bottom surface of the receiver 72 and spiral upward at an approximate 8-degree angle along the margin 73 to a position less than half the circumference away from their point of origin. The top surface 74 of the tabs 70 provides the supporting structure for and operatively connects with a collection of external helical tabs 104 of the cartridge top member 16, shown in FIG. 6 and described below.

Figure 6:
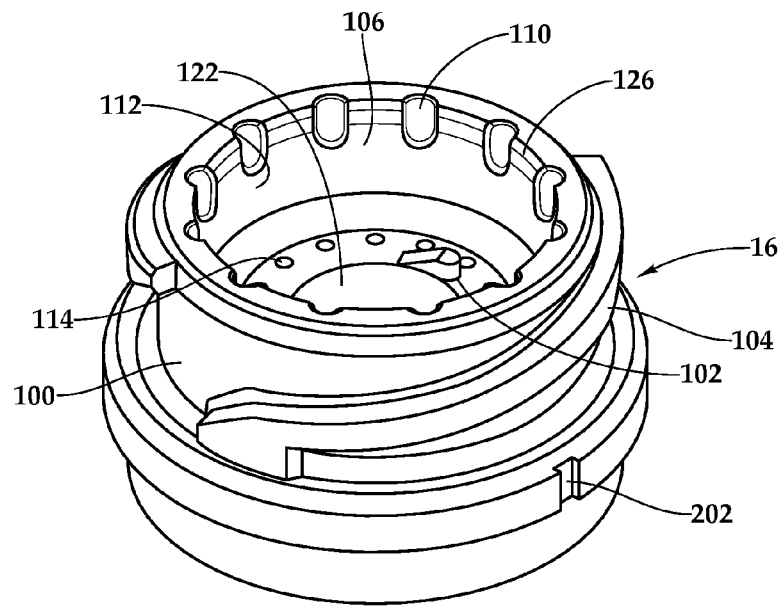
FIG. 6 is a perspective view of the cartridge top member, topside.
Figure 7:
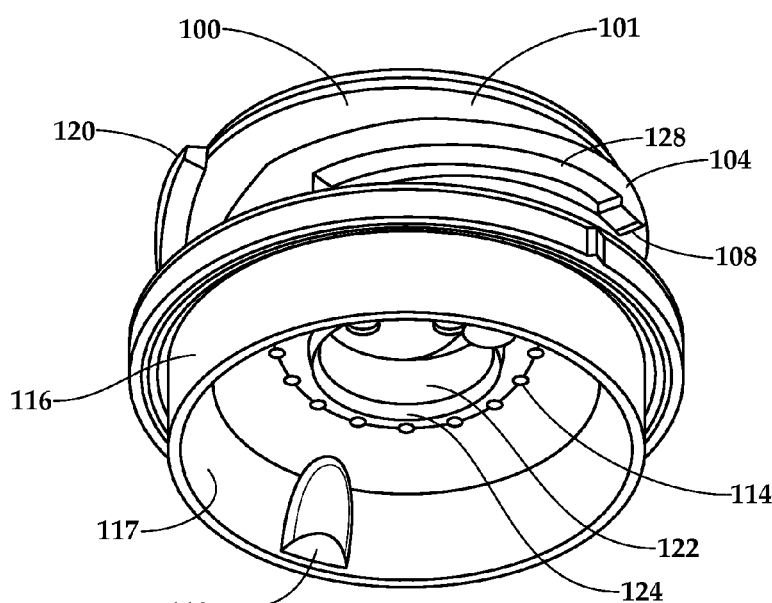
FIG. 7 is a perspective view of the cartridge top member, underside.

Turning now to FIGS. 6 and 7, cartridge top member 16 includes member body 100. The cartridge top member 16 provides a neck portion having a fluid inlet and a fluid outlet. Member body 100 has a margin 101 from which a collection of exterior helical tabs 104 operatively connect with the interior helical tabs 70 of cartridge receiver 72. As with the interior helical tabs 70, the exterior helical tabs 104 spiral upward at an approximate 8-degree angle along the margin 101 to a position less than approximately half the circumference away from their point of origin. An underside surface 128 of these tabs is supported by a top surface 74 of the interior helical tabs 70 of manifold assembly 12, shown in FIG. 4. As can be seen in FIGS. 6 and 7, each of the exterior helical tabs 104 has at its end point a ramp 120 for facilitating engagement with the interior helical tabs 70.

The cartridge top member body 100 has defined therein an interior receiver well 106 with an inside margin 112 for substantially sealing with an O-ring 34 of the manifold assembly 12 as shown in FIG. 1. This substantially effects a fluid seal between unfiltered inlet water within the receiver well 106 and the cavity of the manifold assembly body 20.

As illustrated FIGS. 5, 6, 7, and 8, a collection of inlet orifices 114 are formed within the bottom surface of the receiver well 106. The orifices 114 are spaced circumferentially and substantially equidistant from each other, although any other appropriate spacing and numbers of orifices can be used. In some embodiments, the inside diameter of any individual orifice can be designed such that the adhesive forces between the inside surface and any remaining water within that orifice may allow for capillary action to prevent dripping when the cartridge assembly 14 is disengaged from the manifold assembly 12. The orifices 114 direct inlet water to the cartridge housing 18.

An outlet bore 122 is bored through the center of the cartridge top member 16. Within the outlet bore 122, the reduced body portion 56 of the cartridge insert 50 is engaged for conveyance of filtered water. A lip 124 protrudes from the underside of the outlet bore 122, positioning the filter 19 within the cartridge assembly 14. Two of the ramps 102 extend upward from the bottom of the receiver well 106. One or the other of the ramps 102 radially aligns with a high-flow valve 28 contact surface 41 to compress and open the valve 28 when the cartridge top member 16 is rotatably moved into place to operatively connect with the manifold assembly 12.

The underside surface 128 of each of the helical tabs 104 has a locking tab 108 for operatively connecting with a cooperative depression 109 located in the interior helical tab 70 of the manifold assembly 12. In some embodiments, the locking tabs 108 can interface with a collection of depressions 109 during engagement of the cartridge assembly 14 with the manifold assembly 12 to lock the cartridge assembly 14 in place and to provide a degree of burst protection to the components of the filter assembly 10, for example to resist unexpected disconnection of the cartridge assembly 14 from the manifold assembly 12. In some embodiments, the locking tabs 108 can disengage from the respective depressions 109 permitting the cartridge assembly 14 to back off from the manifold assembly 12 at a predefined level of hydraulic pressure for the benign disengagement thereof.

Referring to FIGS. 4 and 6, the manifold assembly 12 and the cartridge top member 16 have alignment markers, 200 and 202 respectively, to indicate alignment of both components and engagement of the locking tabs 108.

As illustrated in FIG. 7, the cartridge top member 16 has an exterior face 116 extending circumferentially from the body 100. The interior face 117 of the exterior face 116 progressively slopes centerward to the inlet orifices 114. In some embodiments, this slope can allow for a smoother transition and flow pattern from the interior space within the exterior face 116. Also on the interior face 117 are two weld facilitators 118. The weld facilitators 118 are diametrically opposed from each other.

Figure 8:
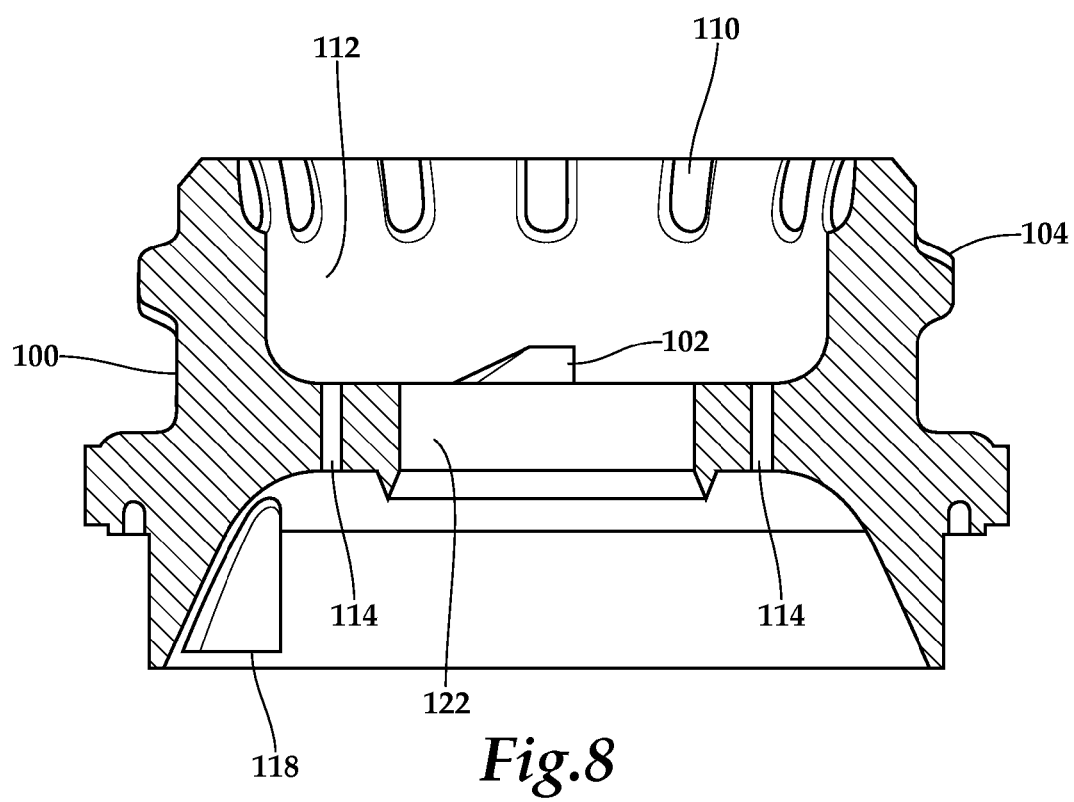
FIG. 8 is a cross sectional view of the cartridge top member taken through its center.

As illustrated in FIGS. 6 and 8, defined around the perimeter of upper sealing surface 112 of the receiver well 106 are a collection of vent ports 110. The vent ports 110 are spaced approximately equidistant around the diameter of the sealing surface 112. The vent ports 110 separate the surface 112 from the interior cavity of the manifold assembly body 20, as shown in FIG. 1. As will be seen, the vent ports 110 allow for relief of pressure trapped in the cartridge assembly 14 before complete disengagement during the disassembly of the cartridge assembly 14 from the manifold assembly 12. The top edge 126 of the receiver well 106 is chamfered to facilitate this relief of pressure.

Figure 9:
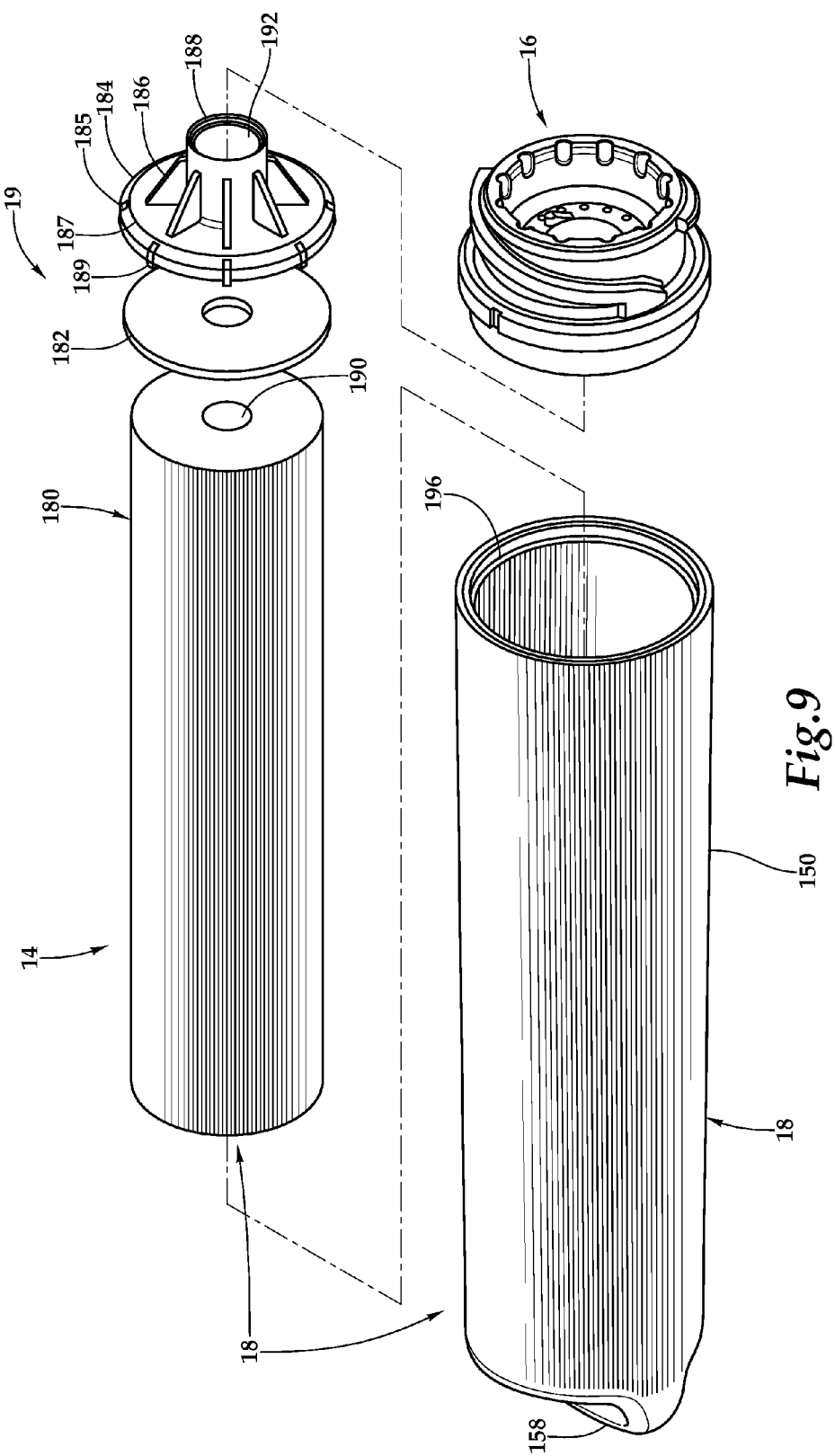
FIG. 9 is an exploded perspective view of the cartridge assembly.
Figure 10:
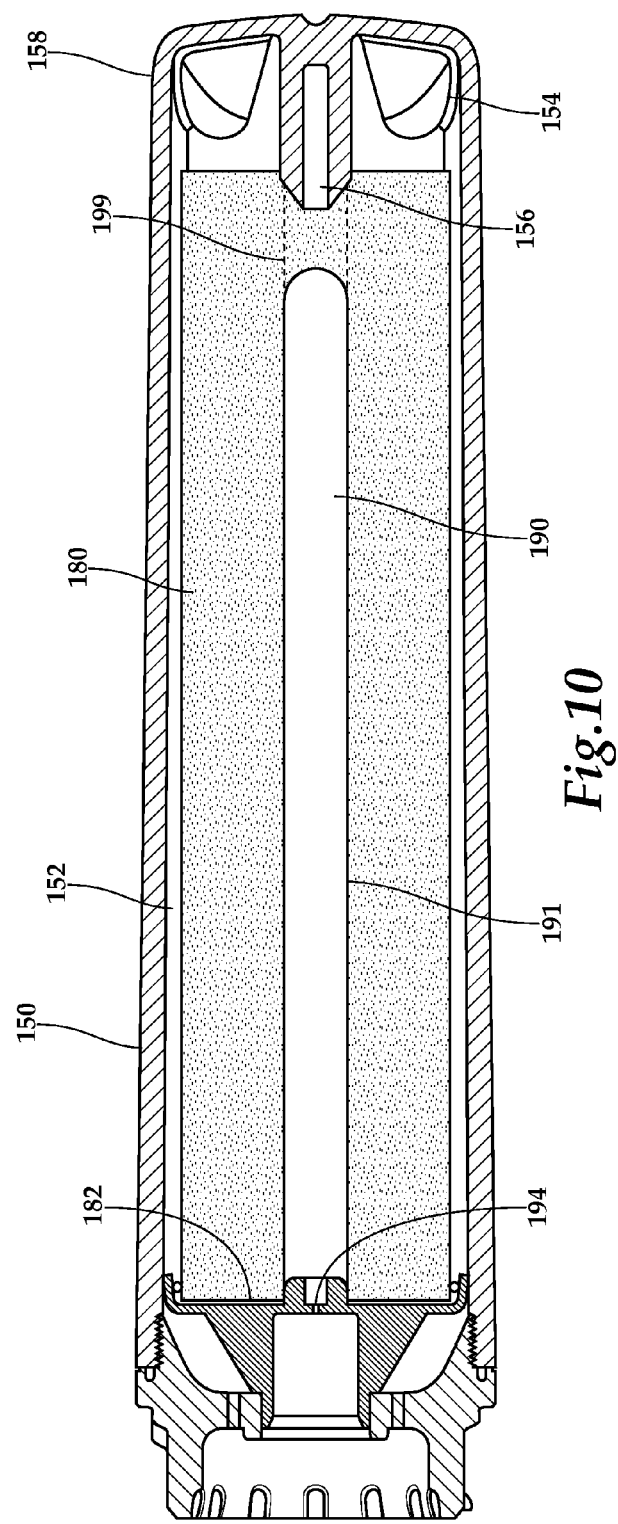
FIG. 10 is a side elevational sectional view of the cartridge assembly.

Turning now to the example cartridge housing assembly 18 as shown in FIGS. 9 and 10, the cartridge housing assembly 18 includes a cartridge housing body 150 and its components as well as a filter assembly 19. The cartridge housing body 150 is a cylindrical housing tapered at one end for insertion of the filter assembly 19. A collection of lateral supports 154 protrude inward from the bottom of body 150 (e.g., the narrow end) for longitudinally supporting the filter assembly 19 in place. Concentric and center to the supports 154 is an upward directed alignment projectile 156, also used to support and center the filter assembly 19 within the cartridge housing body 150. A handle 158 is formed from the bottom of the housing body 150 and is utilized to assist in applying rotational force to the cartridge assembly 14.

The filter 19 includes a carbon filter 180 or other type filter. The carbon filter 180 is made of activated carbon with roughly about one micron particle size in a binder. The carbon block forming the carbon filter 180 has an inner margin 191 that defines an axial bore 190. In the illustrated example, the carbon filter 180 is a molded design as shown in FIG. 10 in which the axial bore 190 does not extend all the way through the filter 180, but instead to a point in which a portion of filter medium exists between the end of the axial bore 190 and an alignment projectile 156. In such examples, the full exterior surface of the filter 180 in fluid contact with the inlet water serves as a filter medium.

In some embodiments, the filter 19 includes an extruded design in which axial bore 190 does extend all the way through carbon filter 180. The extruded design includes an end dam on the bottom of the carbon filter 180 to prevent unfiltered water migration into the axial bore 190. The extruded embodiment is defined by a dashed lines 199 extending through the carbon filter 180, as shown in FIG. 10.

Figure 11:
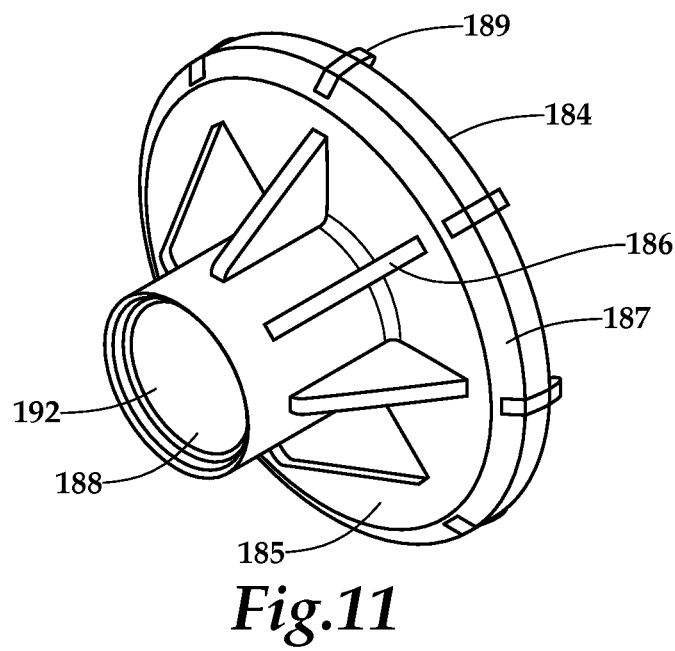
FIG. 11 is a perspective view of the cartridge filter glue dam.
Figure 12:
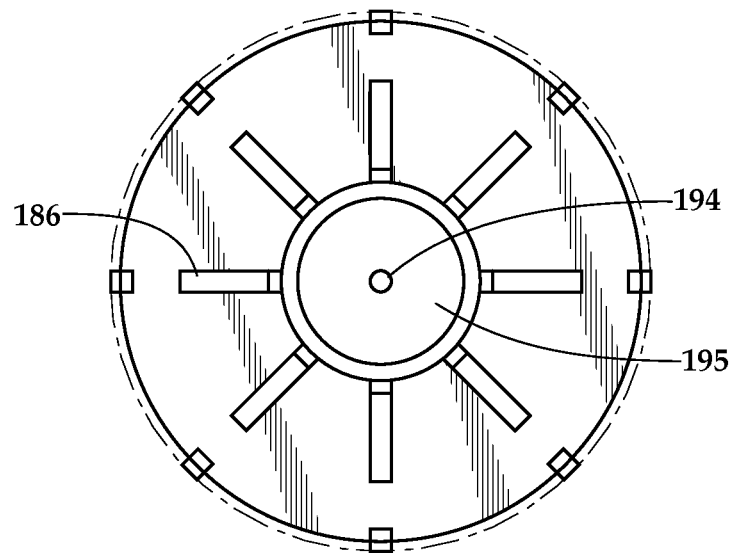
FIG. 12 is a plan view of the filter cartridge glue dam.

The outlet of filter element 19 includes an adhesive layer 182 and a glue dam 184. As shown in FIGS. 11 and 12, the glue dam 184 further includes a disc 185, a collection of supports 186, and an outlet tube 188. The disc 185 has a diameter that is less than that of the inside surface of the cartridge housing body 150, providing a flow path for unfiltered water to the filter 180, shown as an annular space 152 in FIG. 10. To facilitate the flow of water, the outer edge of the disc 185 angles downward via an outer edge 187.

The disc 185 also includes a collection of spacers 189 placed approximately equidistant around an outer edge 187, further defining the annular space available as a path for unfiltered water. A collection of angled supports 186 are spaced approximately equidistant around the top face of the glue dam 184 to brace an outlet tube 188. The interior surface of the outlet tube 188 provides a sealing surface 192. The sealing surface 192 is sized to accept one or more O-rings 32 or the like as described above in FIG. 3 for the purpose of separating unfiltered inlet water from filtered outlet water. The bottom of a sealing surface 192 provides an outlet face 195. Within the outlet face 195 is a bore defining outlet orifice 194, for fluidly connecting filtered outlet water of the filter bore 190 to the outlet bore 40 of the cartridge insert 50.

As shown in FIG. 9, the cartridge top member 16 connects with the cartridge housing assembly 18 through the coupling of the exterior face 116 with the inside surface 196 of the cartridge housing 150.

In operation, from an external connection (not shown), unfiltered water flows through the inlet port 22 of FIG. 1 to the inlet flow passage 29 and into the valve well 42. When the manifold assembly 12 is not engaged with the cartridge assembly 14, the biasing spring 26 imparts a force upon the high-flow valve 28, depressing it from the valve well 42 into the inlet bore 52 of the cartridge insert 50. This effects a substantially watertight seal at the annular surface 37 between the valve well 42 and the inlet bore 52 of the cartridge insert 50.

In coupling operation, the manifold assembly 12 is engaged with the cartridge assembly 14 and specifically, the cartridge top member 16 as follows. The manifold assembly 12 is engaged with the cartridge assembly 14 by matching up the external helical tabs 104 of the cartridge top member 16 with the internal helical tabs 70 of the manifold assembly 12, using one or more of the ramps 120 as an initial guide. The operatively connecting helical tabs 70, 104 will begin to engage the manifold assembly 12 with the cartridge assembly 14 when a rotational motion is imparted to the cartridge assembly 14 relative to the manifold assembly 12. This rotational motion will translate into a longitudinal displacement of the cartridge assembly 14 into the manifold assembly 12, substantially sealing both the interior sealing surface 192 of the outlet tube 188 on FIG. 8, as well as the sealing surface 112 of the cartridge top member 16.

When the alignment marker 200 of the manifold assembly 12 (see FIG. 4) is lined up with the alignment marker 202 of the cartridge top member 16 (see FIG. 6), then the ramp 102 of the cartridge top member 16 will have depressed the high-flow valve 28 within the valve well 42 of the manifold assembly 12 against the compressive force of the biasing spring 26. This allows inlet water to flow through as described above. The alignment of the markers 200 and 202 also indicates that the locking tabs 108 have engaged the depressions 109.

During normal engagement, as described below, the axial force imparted on the high-flow valve 28 by the ramps 102 of the cartridge top member 16 translates through the body of the valve 28, compressing the biasing spring 26 and allowing inlet water to flow from the inlet flow passage 29 through to the receiver well 106 of the cartridge top member 16.

Within the receiver well 106, pressurized water flows through the inlet bores 114 (see FIG. 6) along the interior surface 117 of FIG. 7 and guided around to the outer circumference of the disc 185 and down an outer edge 187 of FIG. 9. Flow proceeds into the annular space 152 defined between the exterior of the filter 180 and the interior surface of the cartridge housing 150 as shown in FIG. 10. Differential pressure between the exterior of the filter 180 and the axial bore 190 forces this inlet water from the annular space 152 through the filter to the axial bore 190. From the axial bore 190, filtered water now flows through the flow restriction outlet orifice 194 through the outlet bore 40 of the cartridge insert 50 to the outlet flow passage 31 of the manifold assembly 12. From there, filtered water exits the manifold assembly 12 through the outlet flow passage 35 and out the outlet port 24 to an external means connected thereto (not shown).

In some embodiments, an adapter can be used to facilitate interconnection of the cartridge assembly 14 and the manifold assembly 12. Such an adapter can allow for the use of filter assembly components 10 not originally designed for use with one another.

The disengagement of the manifold assembly 12 from the cartridge assembly 14 proceeds as follows. With the alignment marker 200 of the manifold assembly 12 aligned with the alignment marker 202 of the cartridge top member 16, at 0 degrees. In some examples, relative rotational motion between the manifold assembly 12 and the cartridge assembly 14 may also provide relative motion along the longitudinal axis. As rotational force is applied to the cartridge assembly 14 to disengage it from the manifold assembly 12, from 0 degrees to substantially 17 degrees from alignment, the locking tabs 108 are unseated from the depressions 109. Simultaneously, the compressive force of the biasing spring 26 acts to close the high-flow valve 28 as the valve 28 rides down the ramp 102 (see FIG. 6). As valve 28 descends (longitudinal relative motion), the ridge 33 approaches the annular sealing surface 37. At substantially 17 degrees of rotation, the biasing spring 26 presses the ridge 33 of the high-flow valve 28 into contact with the annular sealing surface 37, thereby stopping the flow of inlet water to the cartridge assembly. As rotation proceeds, at substantially 34 degrees from alignment, the sealing surface 112 begins to disengage longitudinally from the O-ring 34, thus opening the vent ports 110 to ambient pressure and allowing the vent ports 110 to relieve excess pressure within the cartridge assembly 14. As separation of the cartridge assembly 14 from the manifold assembly 20 advances at approximately 120 degrees from alignment, the cartridge assembly 14 will be free to fully disengage from the manifold assembly 12.

In some embodiments, the locking tabs 108 and the depressions 109 can retain a connection between the manifold assembly 12 and the cartridge assembly 14 under predetermined pressures and flows as described above, and can be manually disengaged in order to separate the manifold assembly 12 from the cartridge assembly 14 (e.g., to facilitate replacement of the cartridge assembly 14). In some embodiments, upon an overpressure condition within the filter assembly, internal pressure can unseat the locking tabs 108 from the depressions 109 without manual intervention and cause disengagement of the cartridge assembly 14 from the manifold assembly 12.

Figure 15:
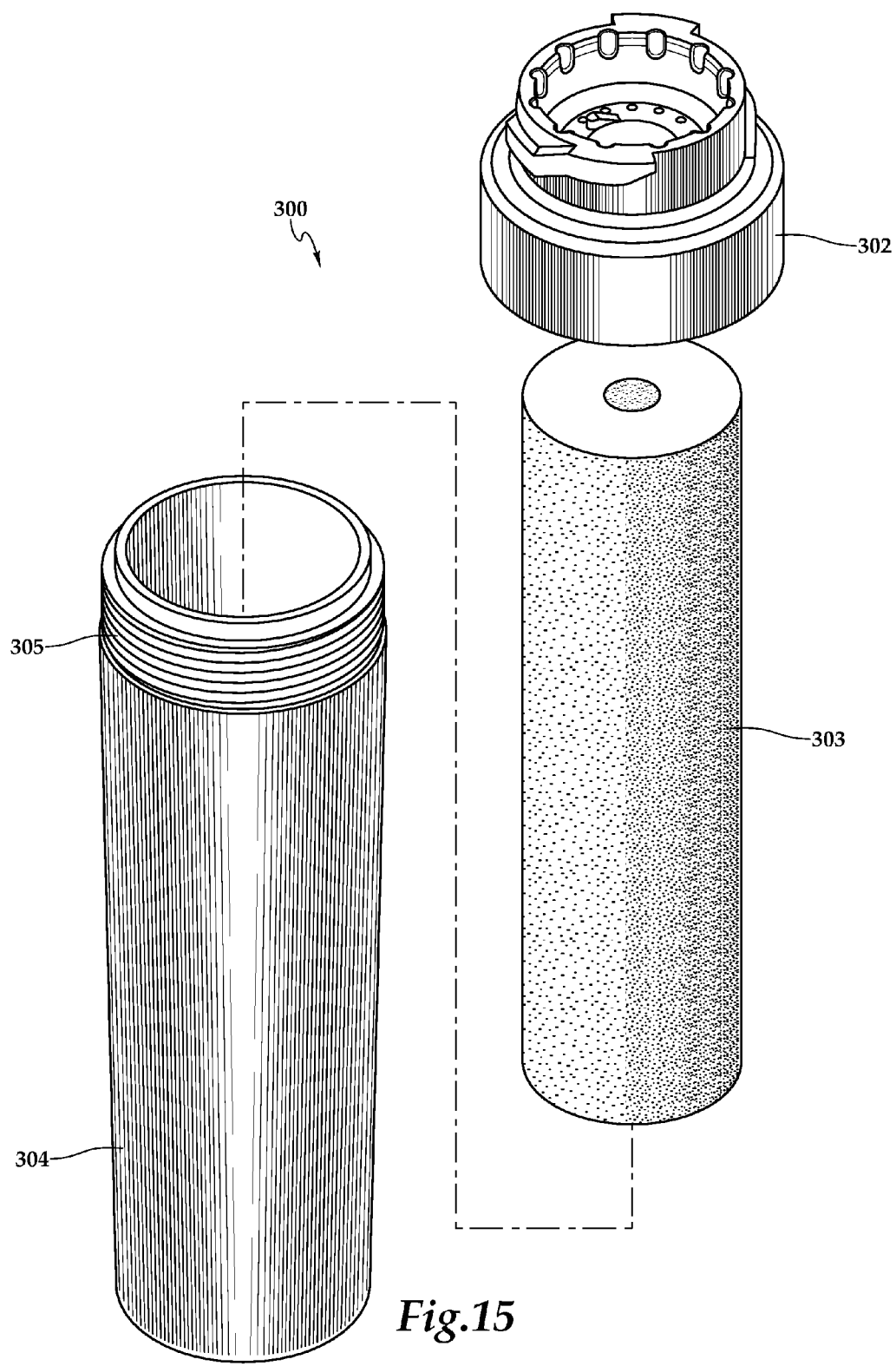
FIG. 15 is an exploded, perspective view of the filter cartridge of FIG. 13.
Figure 18:
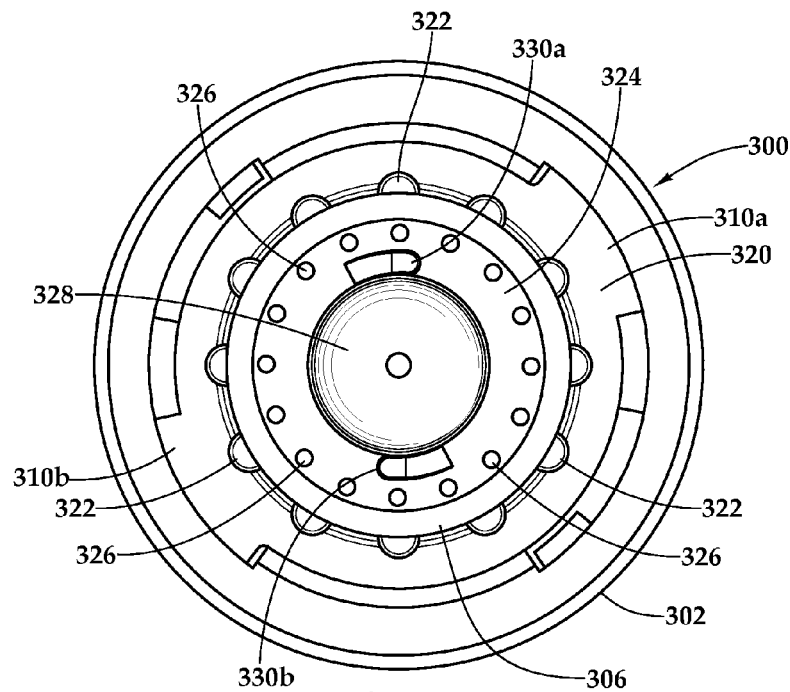
FIG. 18 is a cap-side end view of the filter cartridge of FIG. 13.
Figure 19:
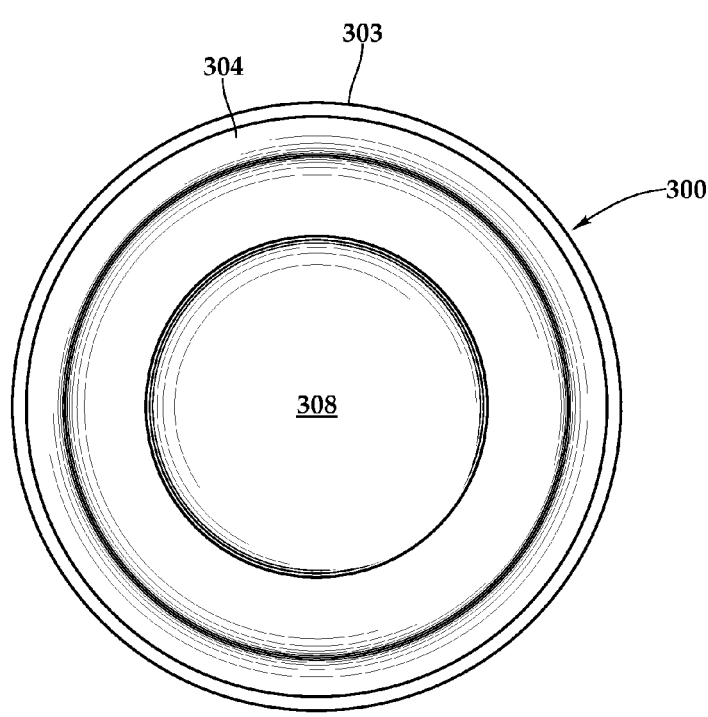
FIG. 19 is a base-side end view of the filter cartridge of FIG. 13.

Referring to FIGS. 13-23, a representative embodiment of a filter cartridge 300 comprising a filter cap 302, a filter media 303 and a filter body 304 is illustrated in which the filter cartridge can be used to compete a two stage engagement structure. In general, the filter cap provides a neck having a fluid inlet and a fluid outlet. The filter media 303 can include a wide variety of filtering medias, for example, depth filtration media, surface filtration media, sand filtration media, activated carbon filtration media, ion exchange filtration media, cross-flow membrane filtration media, and hollow fiber filtration media. The filter cap 302 and the filter body 304 can be fabricated of suitable polymeric materials such as polypropylene, polycarbonate or polyethylene. Alternatively, the filter cartridge 300 can be fabricated from modified polyolefins such as, for example, metallocene modified polypropylene or polyethylene polymers and copolymers, as well as either high or low density polyethylene polymers, having properties such as increased strength, elasticity or increased elongation percentages such as disclosed in U.S. patent application Ser. No. 10/377,022, published as U.S. Pat. Pub. No. 2004/0094468 A1, which is herein incorporated by reference to the extent not inconsistent with the present disclosure. In some embodiments, the filter cap 302 may be constructed of a first polymer, such as polypropylene, having a specific quality such as, for example, strength or rigidity while the filter body 304 is constructed of a second polymer having a different design quality such as, for example, increased elongation percentage or increased stretch. Examples of suitable polymers include metallocene modified polypropylene or polyethylene polymers and copolymers as well as either high or low density polyethylene polymers. The filter cap 302 and the filter body 304 are operatively joined using any suitable joining technique such as, for example, an engageable thread 305 as illustrated in FIG. 15 or, for example, other joining techniques such as adhesives, heat welding, spin welding, ultrasonic welding and any other appropriate means for joining components. The filter cartridge 300 generally comprises an attachment end 306 and a handling end 308.

Figure 20:
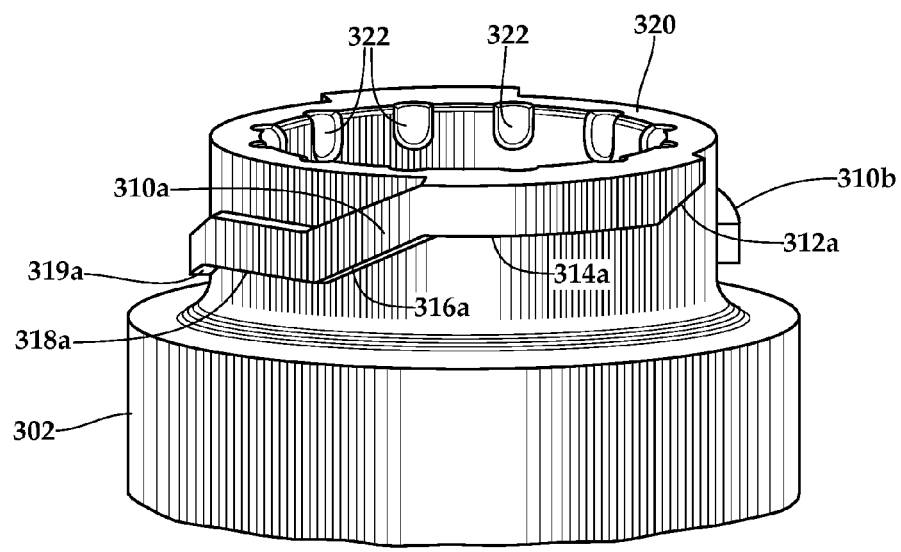
FIG. 20 is a fragmentary perspective view of the filter cartridge of FIG. 13 with an expanded view of a filter cap.
Figure 21:
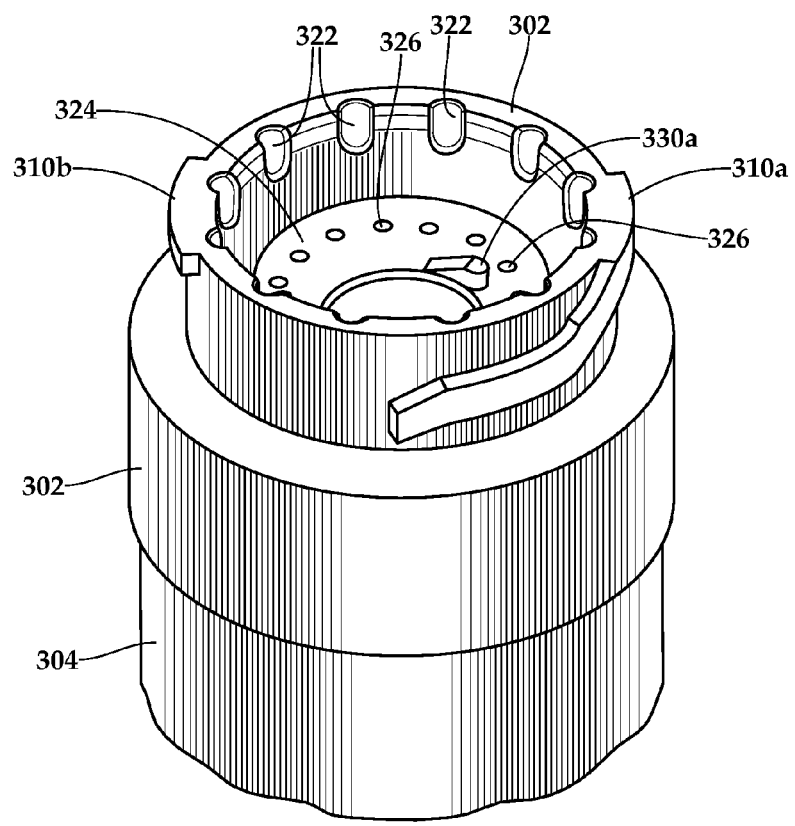
FIG. 21 is a cap-side perspective view of the filter cap of FIG. 20.
Figure 22:
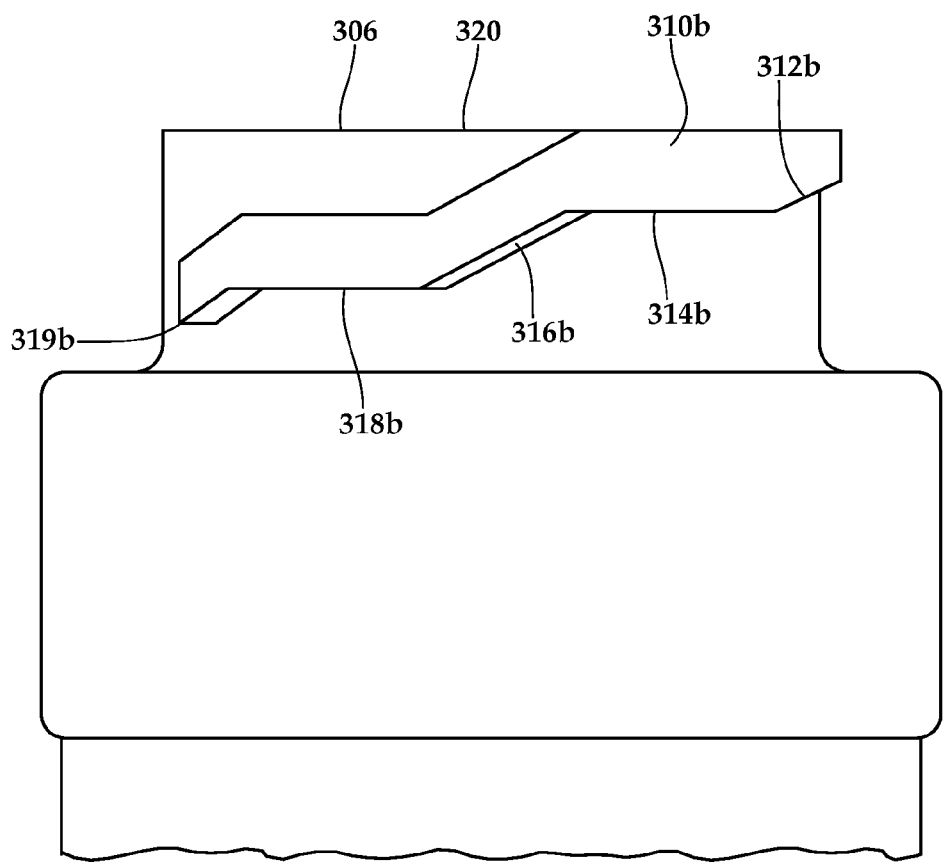
FIG. 22 is a fragmentary side view of the filter cartridge of FIG. 13 with an expanded view of the filter cap of FIG. 20.
Figure 23:
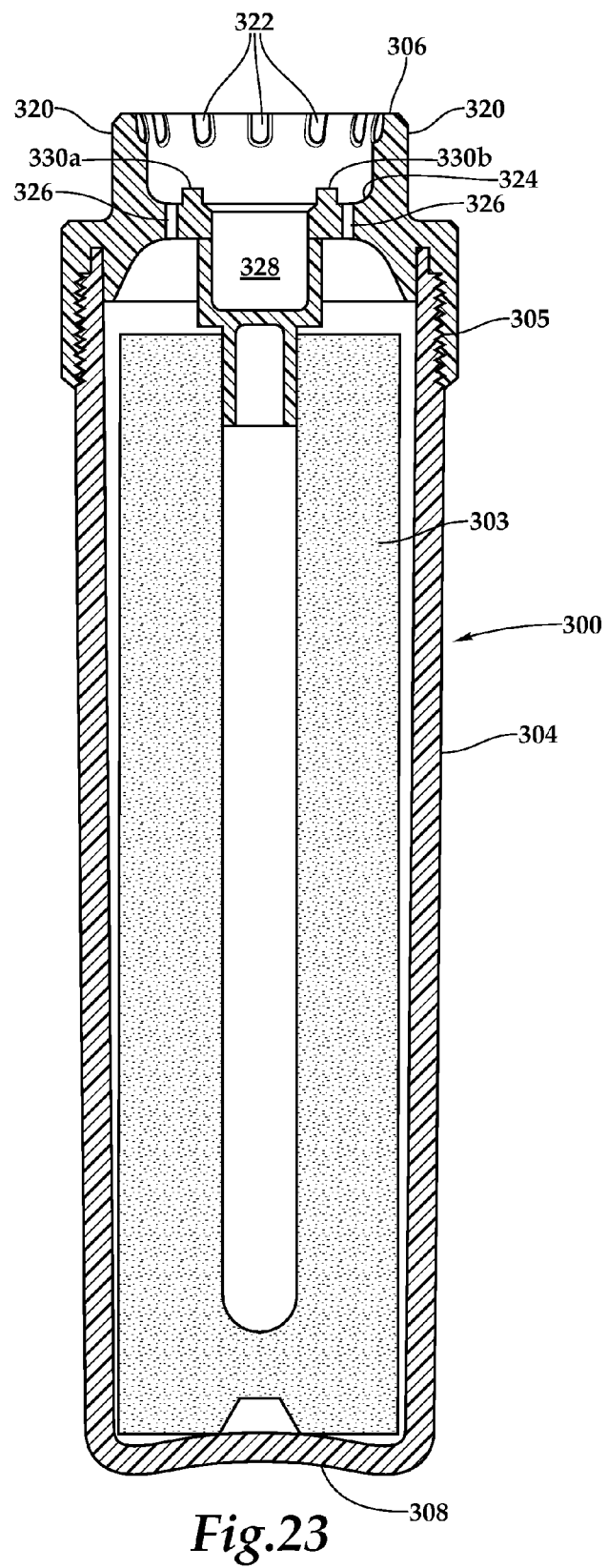
FIG. 23 is a section view of the filter cartridge of FIG. 13 in which the section is taken through the center of the cartridge.
Figure 24:
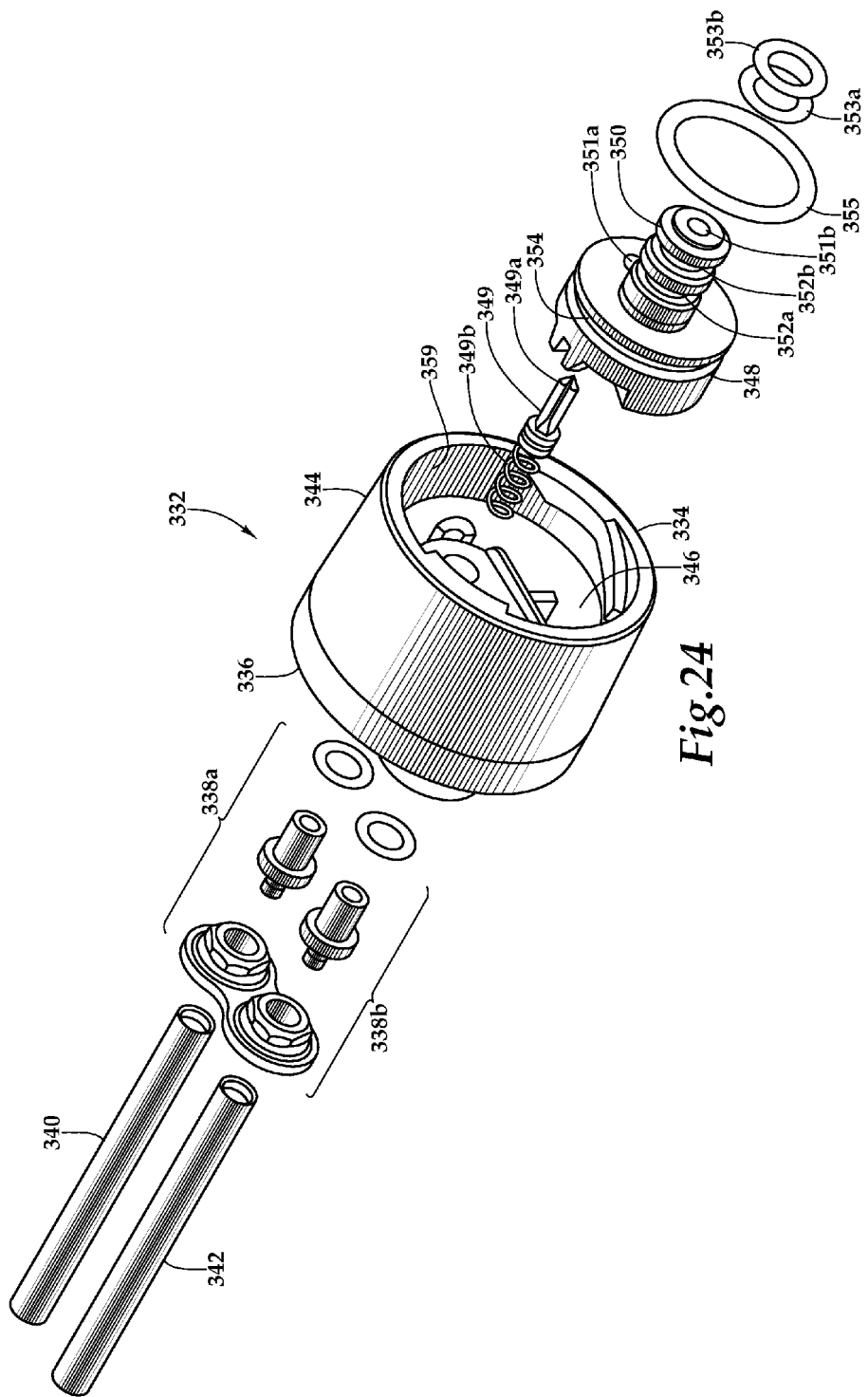
FIG. 24 is an exploded, perspective view of a distribution manifold.

The filter cap 302 can include a pair of opposed and identically configured multi-stage filter attachment members 310a, 310b, for example attachment ramps as illustrated in FIGS. 13-23. As illustrated in FIGS. 17, 20 and 21, the multi-stage filter attachment members 310a, 310b include a first angled portion 312a adjacent to a first horizontal portion 314a, the first horizontal portion 314a facing toward the filter body, a second angled portion 316a adjacent to the first horizontal portion 314a, a second horizontal portion 318a facing toward the filter body, and a third angled portion 319a adjacent to the second horizontal portion 318a. The multi-stage filter attachment member 310b can include a first angled portion 312b, a first horizontal portion 314b, a second angled portion 316b, a second horizontal portion 318b and a third angled portion 319b.

As illustrated in FIGS. 18, 20, 21 and 23, the filter cap 302 comprises a projecting insertion wall 320. A plurality of venting notches 322 is spaced about the inner rim of the insertion wall 320, although a single vent or a different number of venting notches can be used relative to the venting notches shown in the figures. The filter cap 302 further comprises an interface surface 324 having a plurality of feed throughbores 326 and a return throughbore 328. As illustrated, the interface surface 324 also includes a pair of arcuate kick-off ramps 330a, 330b.

Figure 25:
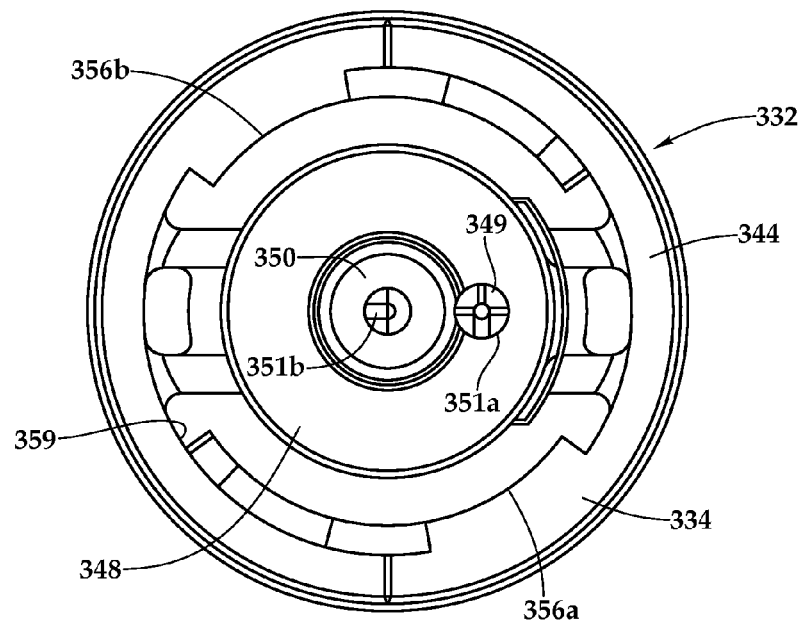
FIG. 25 is a filter-connection end view of the distribution manifold of FIG. 24.
Figure 26:
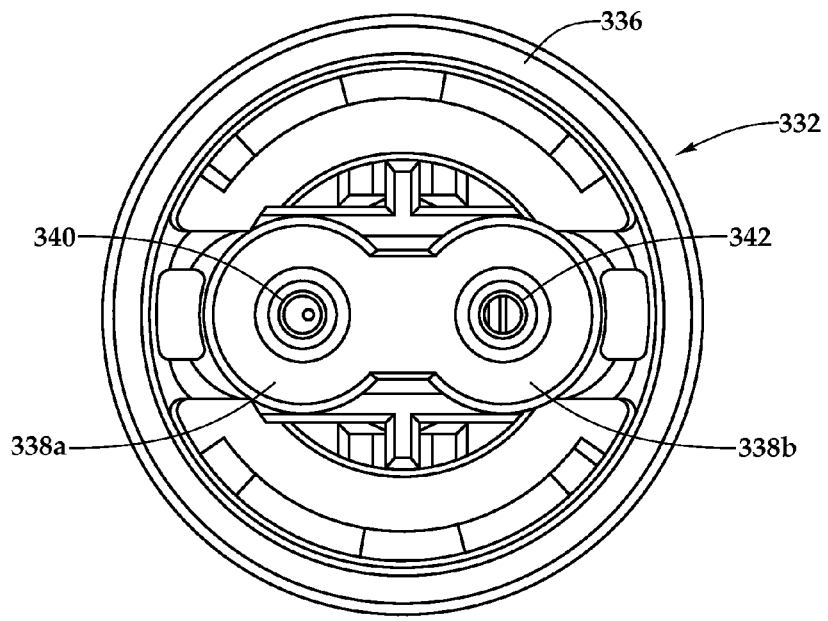
FIG. 26 is an inflow-outflow-connection end view of the distribution manifold of FIG. 24.
Figure 27:
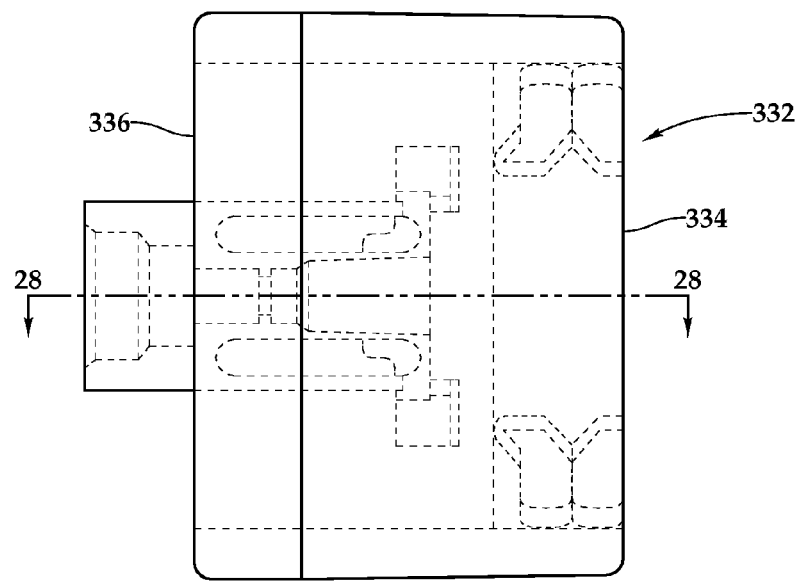
FIG. 27 is a side view of the distribution manifold of FIG. 24 with hidden structure shown in phantom lines.
Figure 28:
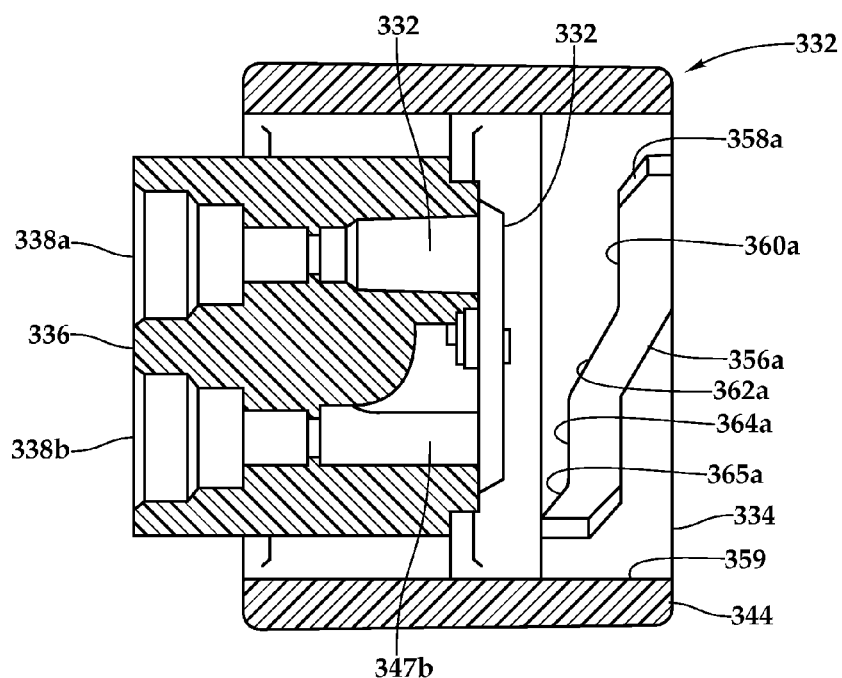
FIG. 28 is a sectional side view of the distribution manifold of FIG. 24 taken along line 28-28 of FIG. 27.
Figure 29:
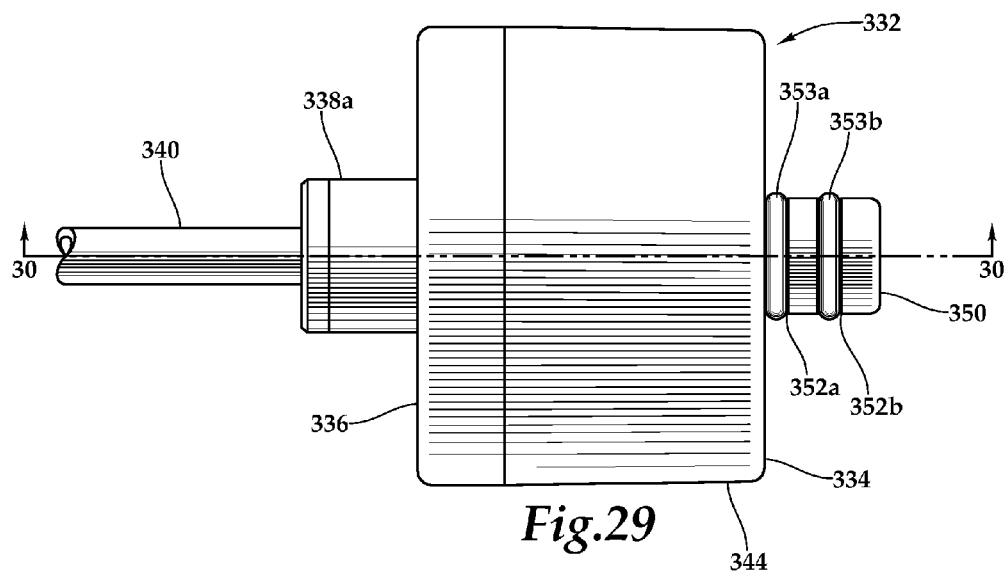
FIG. 29 is a side view of the distribution manifold of FIG. 24.
Figure 30:
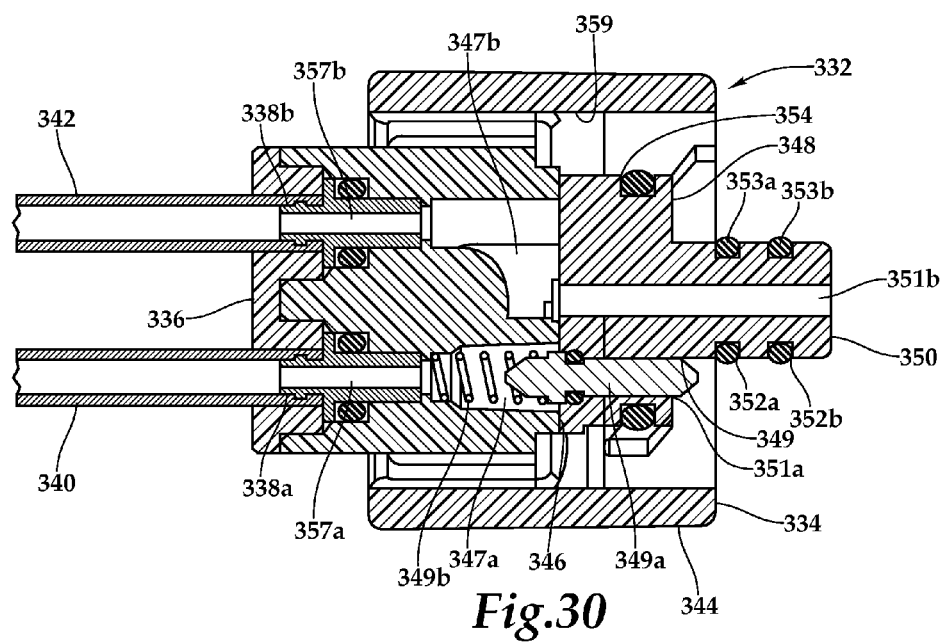
FIG. 30 is a section view of the distribution manifold of FIG. 24 taken at line 30-30 of FIG. 29.

Referring now to FIGS. 24-30, an embodiment of a distribution manifold 332 configured for operable interfacing with the filter cartridge 300 is illustrated. The distribution manifold 332 generally comprises a filter end 334 and a distribution end 336, although alternative embodiments can have distribution connections along a side and/or in the same general direction as the filter end 334. In some embodiments, the distribution manifold 332 can be constructed of the same polymeric material as filter cartridge 300. In some embodiments, the distribution manifold 332 can include a material selected for qualities such as strength, rigidity, cost, and/or ease of fabrication. As illustrated in FIGS. 26, 29 and 30, the distribution end 336 includes a pair of tube connectors 338a, 338b for interconnection to a feed water tube 340 and a filtered water tube 342. As illustrated in FIGS. 25, 29 and 30, the filter end 334 includes an exterior wall 344, an engagement surface 346 and an engagement body 348. The engagement surface 346 includes a feed throughbore 347a, configured to operatively accept a feed valve assembly 349, and a return throughbore 347b. The feed valve assembly 349 includes a valve body 349a and a spring 349b. The engagement body 348 includes a projecting member 350, a projecting feed throughbore 351a, a projecting return throughbore 351b, a pair of projection grooves 352a, 352b, a pair of projection seals 353a, 353b, a circumferential groove 354, and a circumferential seal 355. The engagement body 348 is operatively connected to engagement surface 346 such that a feed fluid circuit 357a is defined by the projecting feed throughbore 351a, the feed throughbore 347a, the tube connector 338a and feed water tube 340 while a filtered fluid circuit 357b is defined by the projecting return throughbore 351b, the return throughbore 347b, the tube connector 338b and filtered water tube 342. Return throughbore 351b is fluidly interconnected with the filtered water tube 342 while the feed throughbore 347 is fluidly interconnected with the feed water tube 340.

In some embodiments, the manifold 332 can be a refrigerator manifold assembly. For example, the manifold 332 can be a manifold assembly of a filter system model listed in TABLE 1, or any other appropriate manifold assembly for a refrigerator, under-sink water filtration system, or other appliance. In some embodiments, the filter cartridge 300 can replace a filter cartridge having a model number listed in TABLE 1.

TABLE 1

| Manufacturer | Filter System Model | Replacement Filter Model |
| --- | --- | --- |
| Electrolux | PureSource Ultra II -M | EPTWFU01 |
|  | PureSource Ultra II -U |  |
|  | PureAdvantage Ultra - M | EWF02 |

TABLE 1-continued

| Manufacturer | Filter System Model | Replacement Filter Model |
| --- | --- | --- |
|  | PureAdvantage Ultra - U |  |
| GE | GE MSWF | MSWF |
| Haier | 60820860 | 60218743 |
| Bosch | 9000 225170 | 9000 674655 |
|  | 9000 705475 |  |
|  | 9000 777508 |  |
| 3M | 4US-MAXL-S01 | 4US-MAXL-F01 & |
|  | 4US-MAXS-S01 | 4US-MAXS-F01 |
|  | 4US-RO-S01 | 4US-RO-POST |
|  | 4US-RO-S01H | 4US-RO-POSTH |
|  | 4WH-Q Series | 4WH-QCTO-F01 |
|  | 4WH-QS-S01 | 4WH-QS-F01 |
|  | 4WH-QCTO-S01 | 4WH-QCTO-F01 |
|  | 4WH-QSS-S01H | 4WH-QSS-F01H |

Figure 33:
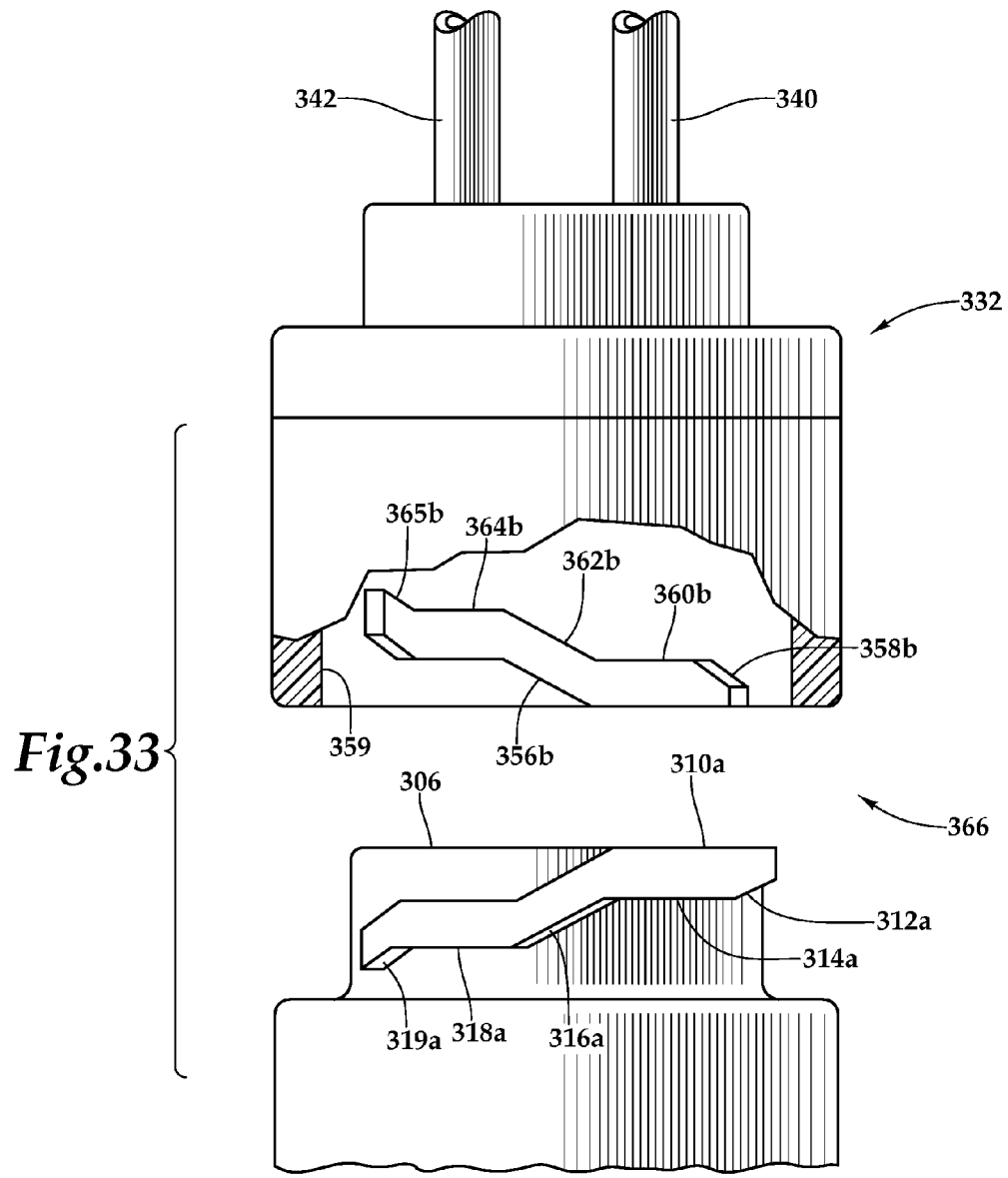
FIG. 33 is a fragmentary, cut-away side view of the water filtration system of FIG. 31 with a portion of the wall of the manifold cut away to show a portion of the multistage ramp engagement mechanism.

As illustrated in FIGS. 25, 28 and 33, the filter end 334 comprises a pair of multi-stage manifold attachment members 356a, 356b, illustrated as attachment ramps, on an interior perimeter wall 359 of the distribution manifold 332. The manifold attachment members 356a, 356b are configured correspondingly to the multi-stage filter attachment members 310a, 310b such that the manifold attachment member 356a includes a first angled portion 358a, a first horizontal portion 360a, a second angled portion 362a, second horizontal portion 364a and third angled portion 365a while the manifold attachment member 356b similarly comprises a first angled portion 358b, a first horizontal portion 360b, a second angled portion 362b, second horizontal portion 364b and third angled portion 365b. The multi-stage filter attachment members 310a, 310b provide a pair of filter engagement surfaces.

In some embodiments, the filter engagement surfaces may not include a first filter horizontal portion, a second filter horizontal portion, and an angled filter portion disposed between and joining the first filter horizontal portion to the second filter horizontal portion. In some embodiments, the at least one filter engagement surface may include a first and a second filter engagement surface on generally opposite sides of the filter cap 302 (e.g., the neck portion), and the first filter engagement surface may include no more than one horizontal portion or even no horizontal portions. Embodiments such as these will be discussed further in the descriptions of FIGS. 41A-46B.

Figure 31:
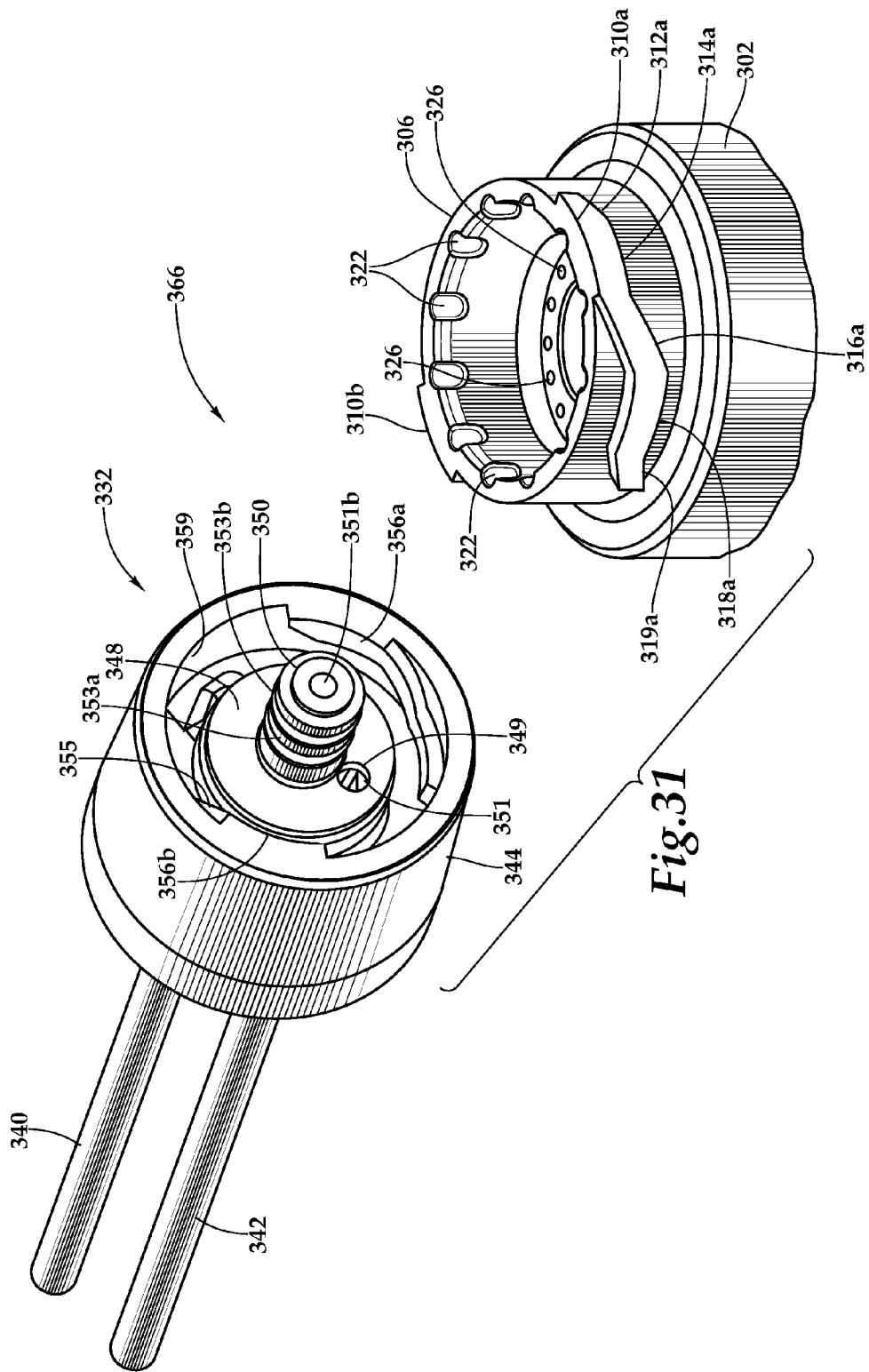
FIG. 31 is an exploded, perspective view of a water filtration system comprising the filter cartridge of FIG. 13 and the distribution manifold of FIG. 24.
Figure 32:
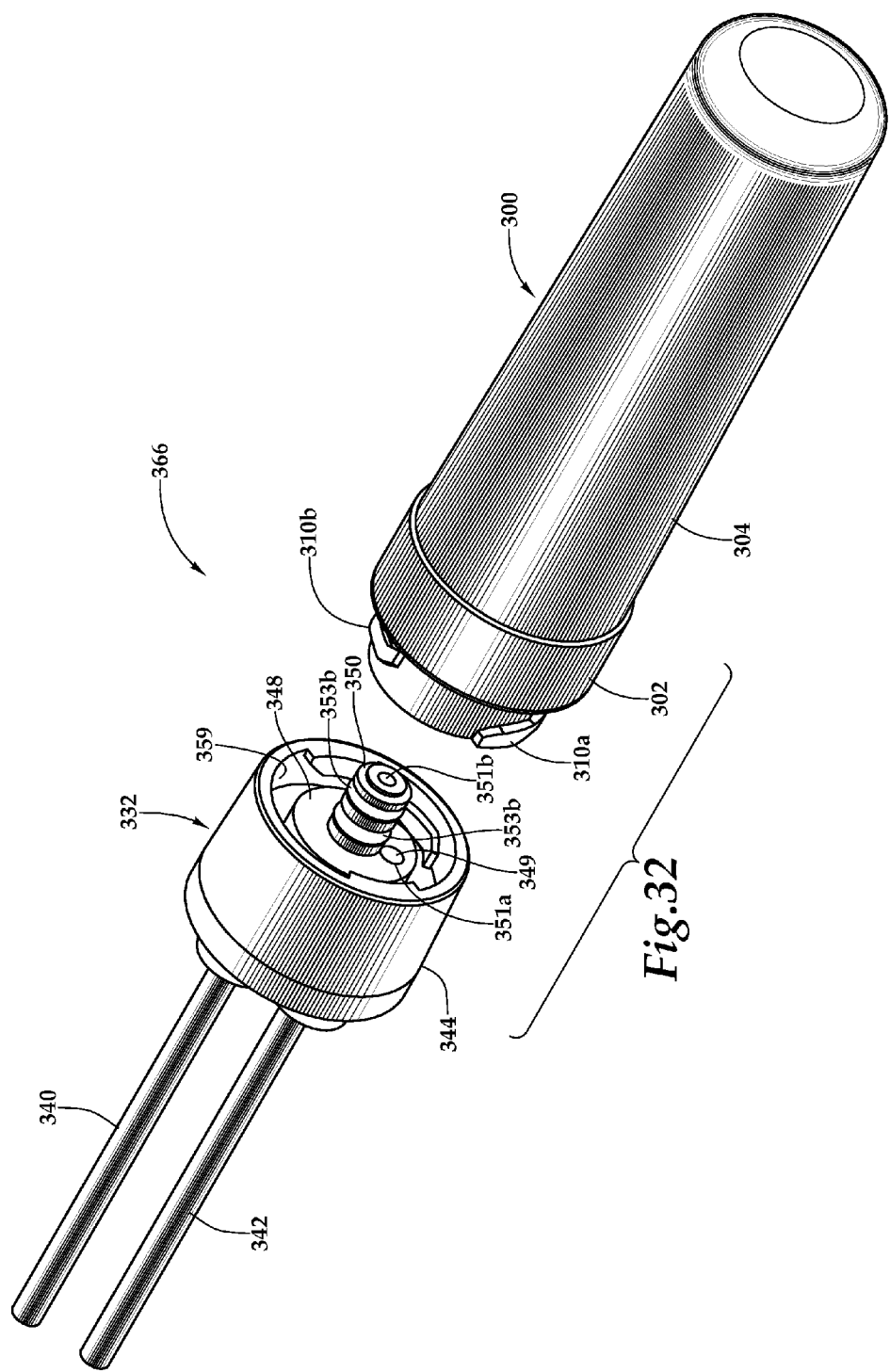
FIG. 32 is an alternative exploded, perspective view of the water filtration system of FIG. 31 with the manifold and filter cartridge aligned for attachment.
Figure 34:
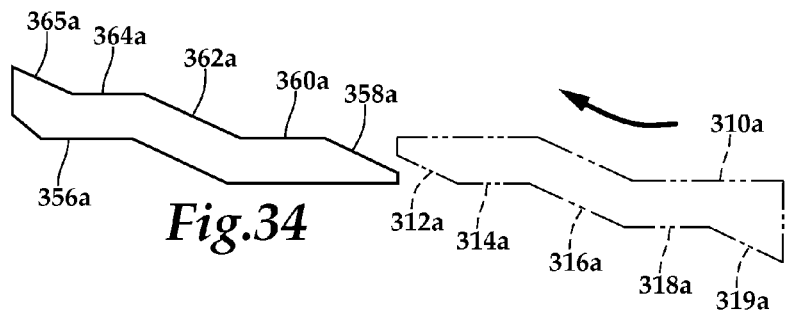
FIG. 34 is a side view of a multiple-stage ramp engagement mechanism in a disconnected orientation.

In order to provide filtered water, the filter cartridge 300 is operatively connected to the distribution manifold 332 to form a filtration system 366, as illustrated in an example disconnected configuration in FIGS. 31, 32 and 33. First, the attachment end 306 is oriented to face the filter end 334, as shown in FIGS. 32 and 33. The filter cartridge 300 is directed toward the distribution manifold 332 such that the insertion wall 320 enters the interior space defined by the exterior wall 344. The projecting member 350 is aligned with the return throughbore 328. In such a configuration, the filter attachment members 310a, 310b are in proximity to the manifold attachment members 356a, 356b, for example as illustrated in FIG. 34. While engagement of the filter attachment members 310a, 310b and the manifold attachment members 356a, 356b is illustrated with respect to the filter attachment member 310a and the manifold attachment member 356a, in some embodiments the filter attachment member 310b and the manifold attachment member 356b can engage in a like manner. In some embodiments both of the filter attachment members 310a, 310b and the manifold attachment members 356a, 356b can be configured in an opposed relation such that the filter attachment member 310a can engage similarly with both of the manifold attachment members 356a, 356b while the filter attachment member 310b can also engage with both of the manifold attachment members 356a, 356b. In some alternative embodiments, there can be instances in which one operable orientation is desired for the filter cartridge 300 to operatively connect to the distribution manifold 332 to form the filtration system 366. One example can include the filtration system 366 utilizing crossflow filtration media with the filter cartridge 300, such as, for example, membrane or hollow-fiber based crossflow filtration systems as disclosed in U.S. patent application Ser. No. 10/838,140, published as U.S. Pat. Pub. No. 2004/0251192, which is herein incorporated by reference to the extent not inconsistent with the present disclosure.

Figure 35:
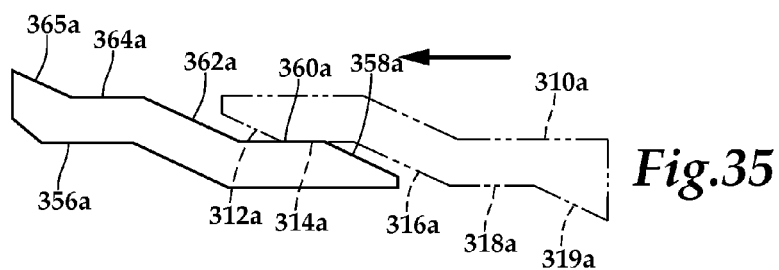
FIG. 35 is a side view of the multiple-stage ramp engagement mechanism of FIG. 34 in a first partially-engaged orientation.

As illustrated in FIG. 34, the filter attachment member 310a and the manifold attachment member 356a can be positioned such that the first angled portion 312a is in proximity to the first angled portion 358a. In use, an installer can rotatably direct the handling end 308 such that the filter cartridge 300 may be rotatably inserted with respect to the distribution manifold 332. As the first angled portion 312a and the first angled portion 358a engage each other, the filter cartridge 300 and distribution manifold 332 are drawn closer together. As the filter cartridge 300 is rotated further, the first horizontal portion 314a and the first horizontal portion 360a are directed into intimate contact as shown in FIG. 35. In some implementations, this configuration may correspond with the first engagement stage and can be a stable engagement position.

Figure 36:
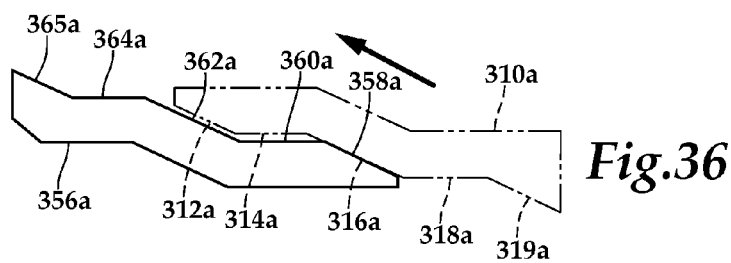
FIG. 36 is a side view of the multiple-stage ramp engagement mechanism of FIG. 34 in a second partially-engaged orientation.
Figure 37:
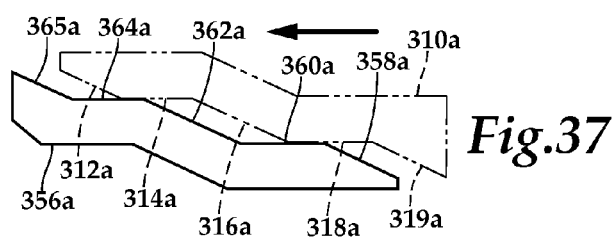
FIG. 37 is a side view of the multiple-stage ramp engagement mechanism of FIG. 34 in a third partially-engaged orientation.
Figure 38:
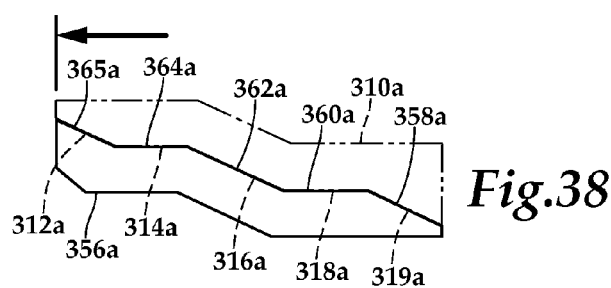
FIG. 38 is a side view of the multiple-stage ramp engagement mechanism of FIG. 34 in a fully engaged orientation.

As the filter cartridge 300 is rotated further, the first angled portion 312a interfaces with the second angled portion 362a while the second angled portion 316a engages the first angled portion 358a as shown in FIG. 36, thus, further drawing together the filter cartridge 300 and the distribution manifold 332 such that the projection seals 353a, 353b sealingly engage the wall surrounding the return throughbore 328 while the circumferential seal 355 sealingly engages the interior perimeter surface of the projecting insertion wall 320. Continued rotation of the filter cartridge 300 causes the first horizontal portion 314 to slidingly contact the second horizontal portion 364a while the second horizontal portion 318a engages the first horizontal portion 360a, as shown in FIG. 37. In some implementations, this configuration can be the second engagement stage. It will be understood by a person of skill in the art that horizontal portions are substantially horizontal in that they provide resistance against rotation in response to predetermined operating pressures exerted on the filter cartridge. Attachment of the filter cartridge 300 to the distribution manifold 312 is complete when the first angle portion 312a seats against the third angled portion 365a while the third angle portion 319a engages the first angle portion 358a, as illustrated in FIG. 38. As the filter cartridge 300 and the distribution manifold 312 approach an installed position, one of the arcuate kick-off ramps 330a, 330b engages the feed valve assembly 349 such that the spring 349b is compressed and the feed fluid circuit 357a is opened to incoming water. As the rotation of filter cartridge 300 is completed, the filter cartridge 300 and the distribution manifold 332 cannot disengage without rotating the filter cartridge 300 in a direction opposed to that indicated in FIGS. 40-44.

In operation, feed water flows through the feed flow circuit 357a into the filter cartridge 300. The feed water is directed through the filter media 303 such that selected contaminants such as, for example, ionic, organic or particulate, are removed from the water such that filtered water is present in the center of the filter media 303. Purified water flows out of the filter cartridge 300 by way of the return throughbore 328 and the filtered fluid circuit 357b.

Figure 39:
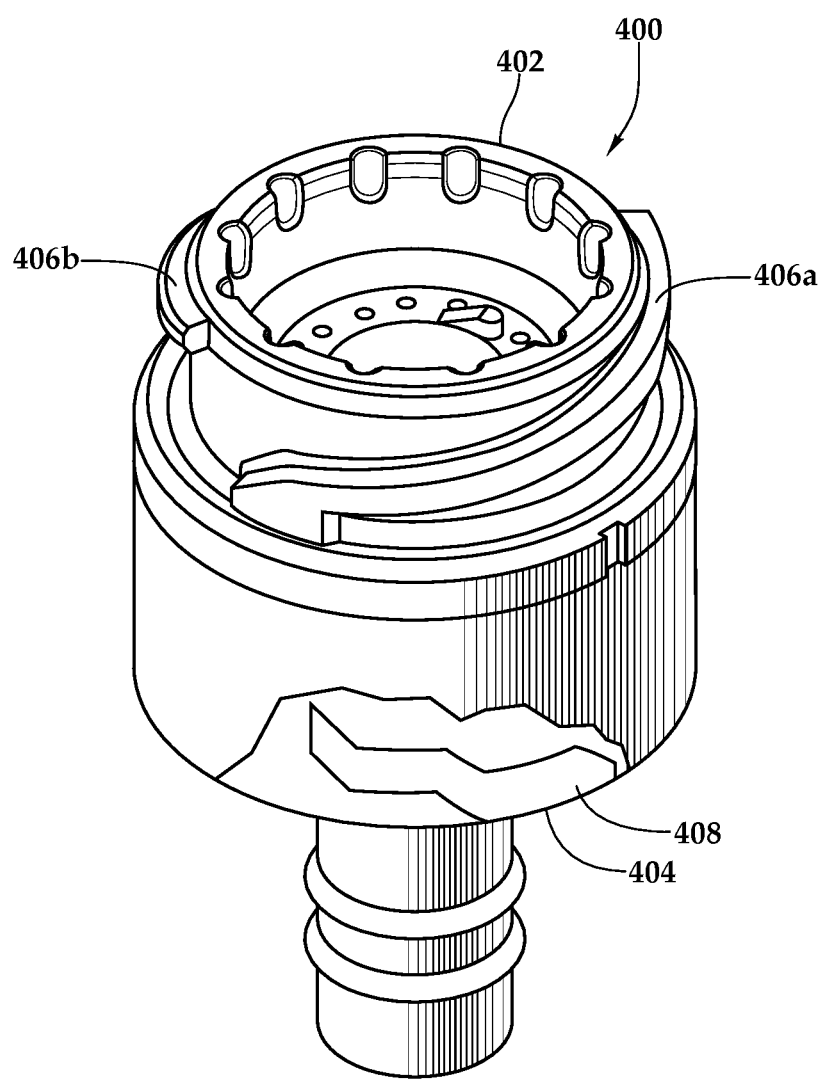
FIG. 39 is a side, perspective view of an adapter for adapting the manifold assembly of FIG. 1 to accept the filter cartridge of FIG. 13.

As illustrated in FIG. 39, an adapter 400 can be used to impart features such as, for example, multi-stage engagement mechanisms to water filtration systems lacking such features. The adapter 400 can include a manifold end 402 and a filter end 404. As shown in FIG. 39, the adapter 400 is adapted such that the previously described manifold assembly 12 can accept the filter cartridge 300. As shown in FIG. 39, the manifold end 402 can substantially resemble the cartridge top member 16 while the filter end 404 can substantially resemble the filter end 334. The manifold end 402 can comprise, for example, a pair of manifold attachment members 406a, 406b, shown in FIG. 39 as helical engagement members, such that the manifold end 402 is operatively connectable to the manifold assembly 12. The filter end 404 can include a pair of multi-stage engagement mechanisms 408, such that the filter end 404 can operatively connectable to the filter cartridge 300. The manifold end 402 can be adapted such that the adapter 400 remains either permanently operatively connected to the manifold assembly 12 or removal of adapter 400 from manifold assembly 12 requires more torque as compared to removal of the filter cartridge 300 from the filter end 404 such that the adapter 400 need only be attached to the manifold assembly 12 one time.

Figure 40:
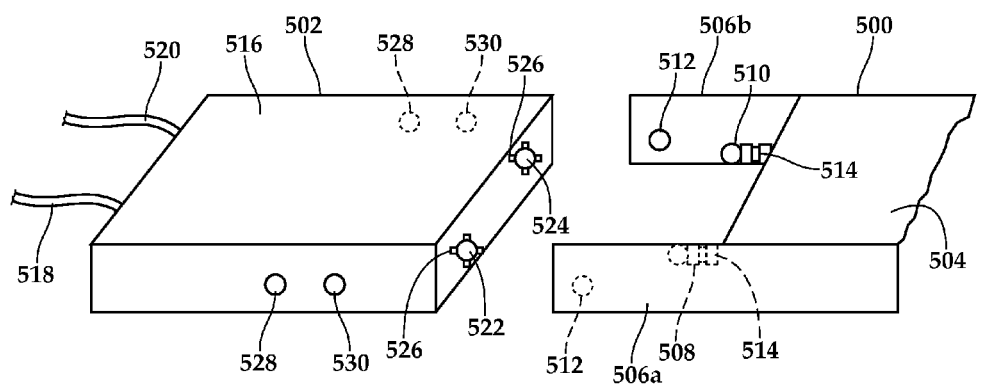
FIG. 40 is an exploded, perspective view of a distribution manifold and a filter cartridge having a linear multi-stage interconnection mechanism.

In addition to rotational engagement of a filter cartridge to a manifold, a filter cartridge 500 and a distribution manifold 502 can be linearly engaged in a multi-stage manner so as allow venting of any entrained energy within the filter cartridge 500, for example, as shown in FIG. 40. The filter cartridge 500 includes a filter body 504, a pair of engagement arms 506a, 506b, a filter inlet 508 and a filter outlet 510. The engagement arms 506a, 506b include an engagement tab 512. The filter inlet 508 and the filter outlet 510 can each comprise at least one sealing member 514. The distribution manifold 502 can comprise a manifold body 516, a feed supply tube 518, a distribution tube 520, a supply bore 522 and a return bore 524. The supply bore 522 and the return bore 524 can each comprise at least one vent channel 526. The manifold body 516 includes a first engagement recess 528 and a second engagement recess 530 on each side of the manifold body 516.

The filter cartridge 500 is slidably attached to the distribution manifold 502 by directing the filter inlet 508 into the supply bore 522 and the filter outlet 510 into the return bore 524. The engagement arms 506a, 506b are configured to slidably advance over the outside of the manifold body 516 until the engagement tab 512 is retainably positioned within the corresponding first engagement recess 528. At this point, the sealing members 514 sealingly engage the inside perimeters of the supply bore 522 and the return bore 524 such that water to be filtered can flow from the feed supply tube 518, through the supply bore 522, into the filter cartridge 500 through the filter inlet 508, out the filter cartridge 500 through the filter outlet 510 and to points of use through the distribution tube 520.

To remove or replace the filter cartridge 500, a user can slidably directs the filter cartridge 500 away from the distribution manifold 502. As the engagement tab 512 approaches the second engagement recess 530, the seal created by the sealing members 514 and the inner perimeter of the supply bore 522 and the return bore 524 are broken allowing any retained energy in the filter cartridge 500 to be released or vented through the vent channel 526. As the filter cartridge 500 is vented, the filter cartridge 500 is retainably attached to the distribution manifold 502 through the interaction of the engagement tabs 512 and the second engagement recesses 530. In some embodiments, the fluid connections and engagement structures or portions thereof can be reversed relative to the filter cartridge and the manifold assembly to form other slidably engaging filter assemblies. Similarly, other designs of flow connectors can be effectively used for slidably engaging structures.

It has now been determined that filters having non-congruent engagement surfaces, structures, or tabs located on the filter can be compatible with the filter manifold depicted in FIGS. 27-33. The manifold depicted in FIGS. 27-33 includes the manifold attachment members 356a and 356b that are configured to be congruent to the multi-stage filter attachment members 310a, 310b. The manifold attachment member 356a includes a first angled portion 358a, a first horizontal portion 360a, a second angled portion 362a, second horizontal portion 364a and third angled portion 365a. While the manifold attachment member 356b similarly comprises a first angled portion 358b, a first horizontal portion 360b, a second angled portion 362b, second horizontal portion 364b and third angled portion 365b. A congruent filter includes the multi-stage filter attachment members 310a, 310b. The multi-stage attachment member 310a can include a first angled portion 312a adjacent to a first horizontal portion 314a, the first horizontal portion 314a facing toward the filter body, a second angled portion 316a adjacent to the first horizontal portion 314a, a second horizontal portion 318a facing toward the filter body, and a third angled portion 319a adjacent to the second horizontal portion 318a. The multi-stage filter attachment member 310b can include a first angled portion 312b, a first horizontal portion 314b, a second angled portion 316b, a second horizontal portion 318b and a third angled portion 319b. As best seen in FIG. 38, when the congruent filter is fully installed into the manifold, the first angled portions (358a, 319a), the first horizontal portions (360a, 318a), the second angled portions (362a, 316a), the second horizontal portions (364a, 314a), and the third angled portions (365a, 312a) of the multi-stage attachment members on both the manifold and the filter are substantially parallel to each other and touching along their respective lengths. A non-congruent filter is any filter engagement surface, structure, or tab that, at least, does not include a first horizontal portion 314, a second horizontal portion 318, and a second angled portion 316 disposed between and joining the first horizontal portion 314 to the second horizontal portion 318 as best seen FIGS. 17 and 25.

Figure 13:
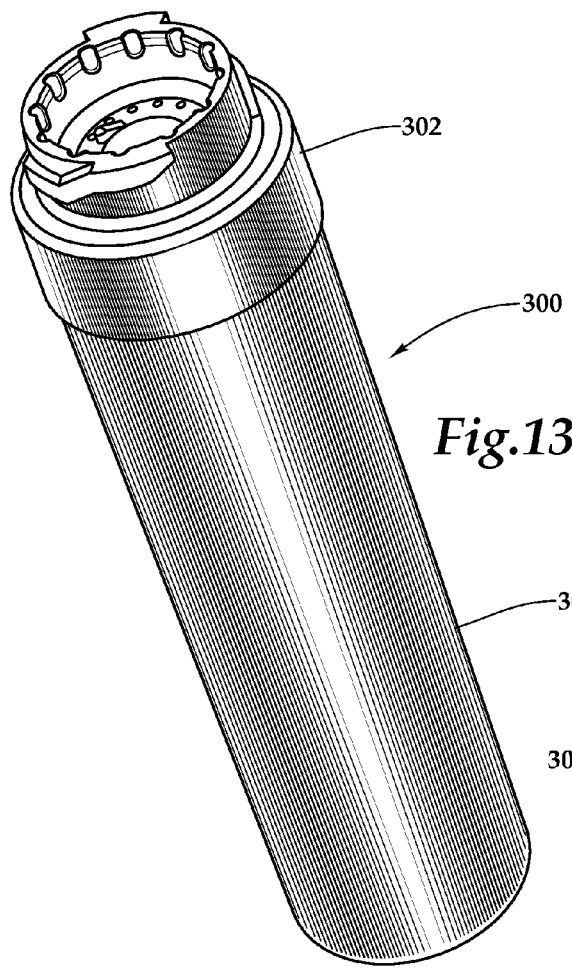
FIG. 13 is a perspective, cap-side view of an embodiment of a filter cartridge having a multiple stage attachment mechanism.
Figure 14:
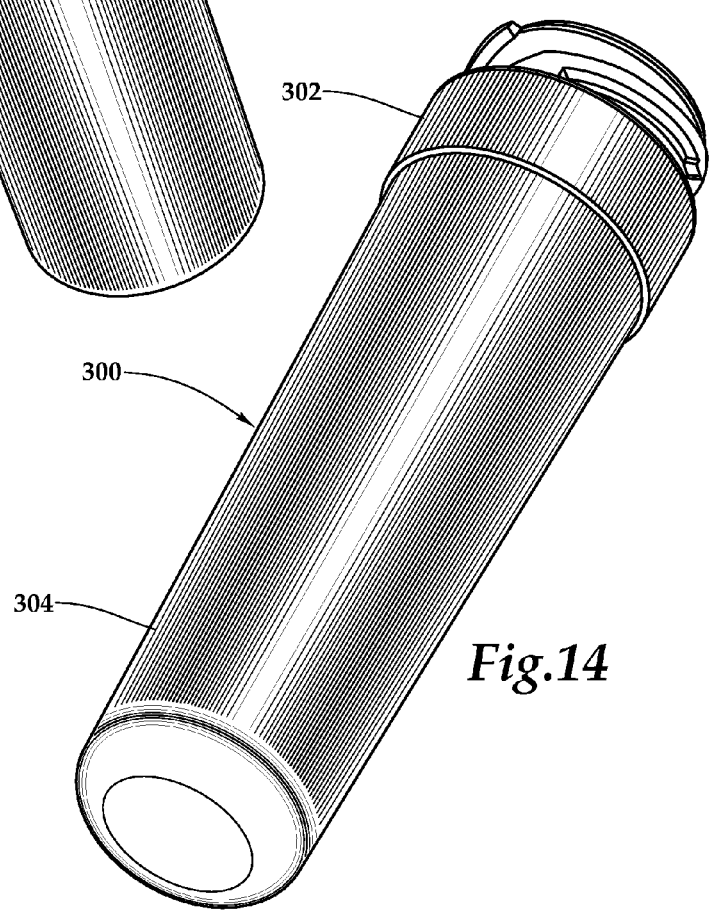
FIG. 14 is a perspective, base-side view of the filter cartridge of FIG. 13.
Figures 41A, 41B:
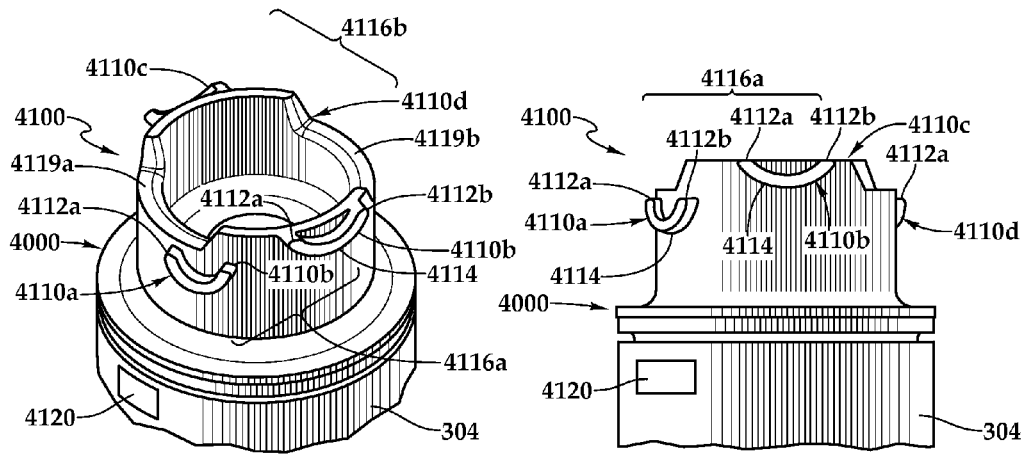
FIG. 41A is a fragmentary perspective view of an embodiment of the filter cartridge of FIG. 13 with an expanded view of another example filter cap.
FIG. 41B is a fragmentary side view of an embodiment of the filter cartridge of FIG. 13 with an expanded view of the filter cap of FIG. 41A.

FIGS. 41A and 41B are fragmentary perspective and side views of a filter cartridge 4000, which is an embodiment of the filter cartridge of FIG. 13 with an expanded view of another example filter cap 4100. In some embodiments, the filter cap 4100 can be used with the filter cartridge 4000 in place of the filter cap 302. In some embodiments, some or all of the features of the filter cap 302 not explicitly shown or discussed with respect to the filter cap 4100 may be included in the filter cap 4100 as well.

In some embodiments, the filter cap 4100 may be used with the filter cartridge 4000 to provide an engagement structure. In some embodiments, the filter cap 4100 may be constructed of a first polymer, such as polypropylene, having a specific quality such as, for example, strength or rigidity. Examples of suitable polymers include metallocene modified polypropylene or polyethylene polymers and copolymers as well as either high or low density polyethylene polymers. In some embodiments, the filter cap 4100 and the filter body 304 may be joined by, for example, an engageable thread or other joining techniques such as adhesives, heat welding, spin welding, ultrasonic welding and any other appropriate means for joining components. In some embodiments, the filter cap 4100 can be integrally formed with the filter body 304 such that the filter cap 4100 is an integral neck portion of the filter body 304.

The filter cap 4100 includes a collection of multi-stage filter attachment members 4110a-4110d. The multi-stage filter attachment members 4110a-4110d are formed as semi-elliptical arcuate ramps or arcs that each include a first end 4112a and a second end 4112b, and an arcuate surface 4114. In some embodiments, the multi-stage filter attachment members 4110a-4110d provide a replacement cartridge engagement surface. The arcuate surface 4114 faces the filter body 304 with the peak of the surface directed generally toward the filter body 304. The multi-stage filter attachment members 4110a and 4110b are arranged as a pair 4116a in relatively proximity to each other, and spaced apart from the multi-stage filter attachment members 4110c and 4110d which are arranged as a pair 4116b generally radially opposed to the pair 4116a across the filter cap 4100. In the illustrated example, the filter engagement surface includes two of the arcuate surfaces 4114 extending from an outer surface of the filter cap 4100 (e.g., the neck portion) and disposed within 180 degrees of rotation on the outer surface. The two arcuate surfaces 4114 are spaced axially and circumferentially apart from each other with respect to a centerline axis of the filter cartridge 4000 and the filter cap 4100 extending in a longitudinal direction.

In the pair 4116a, the multi-stage filter attachment member 4110a is arranged axially closer to the filter body 304 than the multi-stage filter attachment member 4110b. In the pair 4116b, the multi-stage filter attachment member 4110c is arranged axially closer to the filter body 304 than the multi-stage filter attachment member 4110d. The multi-stage filter attachment members 4110a-4110d form filter engagement surfaces that are non-congruent to the manifold engagement surfaces, e.g., the multi-stage manifold attachment members 356a, 356b. In use, the axially and radially offset relative arrangement of the multi-stage filter attachment members 4110a-4110d provide surfaces that can engage with the pair of multi-stage manifold attachment members 356a, 356b, illustrated as attachment ramps, on an interior perimeter wall 359 of the distribution manifold 332 of FIGS. 25, 28 and 33. The multi-stage filter attachment members 4110a-4110d can be non-congruent to the manifold engagement surfaces of the multi-stage manifold attachment members 356a, 356b and yet be suitable for engaging with the manifold engagement surfaces of the multi-stage manifold attachment members 356a, 356b. In some embodiments, the shape and structure of the filter cartridge 4000 and/or the filter cap 4100 can be modified as suitable for the application. For example, in some embodiments the filter cap 4100 can be omitted and the multi-stage filter attachment members 4110a-4110d can be otherwise connected to the filter cartridge 4000.

The multi-stage filter attachment members 4110a and 4110b are arranged as a pair in relatively proximity to each other, and spaced apart from the multi-stage filter attachment members 4110c and 4110d which are arranged as a pair generally radially opposed to the pair 4110a and 4110b across the filter cap 4100 (e.g., the neck portion). Furthermore, the multi-stage filter attachment members are disposed on the neck portion with at least one vent port also located on the neck portion. As seen in the embodiment in FIG. 41A, two vent ports (4119a and 4119b) are located in the neck portion. The vent ports 4119a and 4119b are generally radially opposed to each other and approximately orthogonal to the filter attachment members 4110b and 4110c. The vent ports allow for relief of pressure trapped in the filter cartridge before complete disengagement during the removal of the filter cartridge from the manifold. The filter may include an indicium 4120 in some embodiments. In some embodiments, the indicium 4120 can be a label, sticker, stamp, impression, or any other appropriate indicator that can be visible upon the filter cap 4100 or elsewhere on the filter cartridge 4000 or on the filter's packaging at the point of sale. The indicium 4120 provides compatibility information that indicates the distribution manifolds 332 and/or appliances to which the filter cartridge 4000 can be engaged or that indicates a replaceable filter cartridge. The indicium 4120 can be an indicium selected from the group consisting of a model number and/or other indicium listed in TABLE 1. For example, in one embodiment the indicium 4120 could read "60218743" and in another embodiment the indicium could read "Haier 60218743".

The indicium 4120 and the filter cartridge 4000 can be combined as a kit. In some embodiments, the indicium 4120 can be printed directly on the filter cartridge 4000 or can be printed on a label and attached to the filter cartridge 4000. In some embodiments, the indicium 4120 can be printed on or attached to packaging (not shown) that contains the filter cartridge 4000. In some embodiments, the indicium can be printed on a label or insert that is packaged with the filter cartridge 4000.

Figures 42A, 42B:
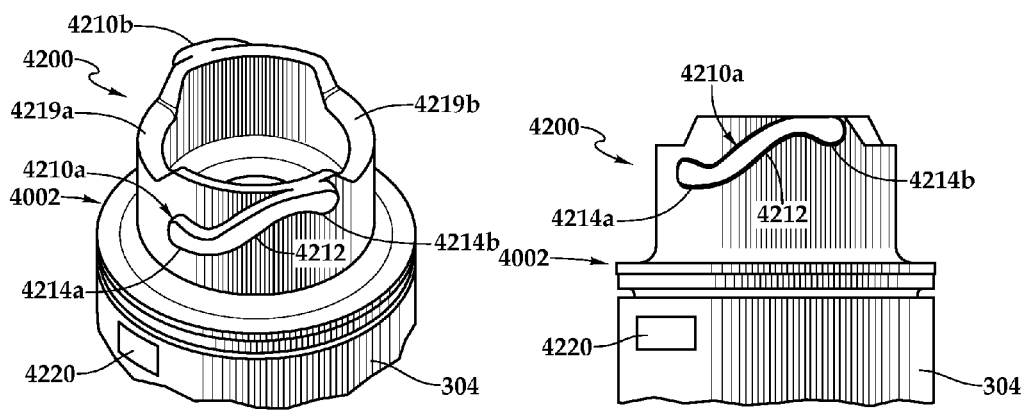
FIG. 42A is a fragmentary perspective view of an embodiment of the filter cartridge of FIG. 13 with an expanded view of another example filter cap.
FIG. 42B is a fragmentary side view of an embodiment of the filter cartridge of FIG. 13 with an expanded view of the filter cap of FIG. 42A.

FIGS. 42A and 42B are fragmentary perspective and side views of a filter cartridge 4002, which is another embodiment of the filter cartridge of FIG. 13 with an expanded view of another example filter cap 4200. In some embodiments, the filter cap 4200 can be used with the filter cartridge 4002 in place of the filter cap 302. In some embodiments, some or all of the features of the filter cap 302 not explicitly shown or discussed with respect to the filter cap 4200 may be included in the filter cap 4200 as well.

In some embodiments, the filter cap 4200 may be used with the filter cartridge 4002 to provide an engagement structure. In some embodiments, the filter cap 4200 may be constructed of a first polymer, such as polypropylene, having a specific quality such as, for example, strength or rigidity. Examples of suitable polymers include metallocene modified polypropylene or polyethylene polymers and copolymers as well as either high or low density polyethylene polymers. In some embodiments, the filter cap 4200 and the filter body 304 may be joined by, for example, an engageable thread or other joining techniques such as adhesives, heat welding, spin welding, ultrasonic welding and any other appropriate means for joining components. In some embodiments, the filter cap 4200 can be integrally formed with the filter body 304 such that the filter cap 4200 is an integral neck portion of the filter body 304.

The filter cap 4200 includes a pair of opposed multi-stage filter attachment members 4210a, 4210b, for example attachment ramps as illustrated in FIGS. 42A and 42B. In some embodiments, the multi-stage filter attachment members 4210a can be identically configured to the multi-stage filter attachment members 4210b. In some embodiments, the multi-stage filter attachment members 4210a can be different than the multi-stage filter attachment members 4210b. In some embodiments, the multi-stage filter attachment members 4210a-4210b provide a replacement cartridge engagement surface. The multi-stage filter attachment members 4210a, 4210b are generally S-shaped curved members that include a curved portion 4212 extending from a first portion 4214a that is either horizontal as shown or optionally curved (not illustrated), which faces the filter body, to a second portion 4214b that is either horizontal as shown or optionally curved (not illustrated), which also faces the filter body. The first portion 4214a is located relatively axially closer to the filter body than the second portion 4214b. The multi-stage filter attachment member 4210b is arranged axially opposite the multi-stage filter attachment member 4210a and is not clearly shown in FIGS. 42A and 42B. The multi-stage filter attachment member 4210b is configured substantially the same as the multi-stage filter attachment member 4210a. In the illustrated example, the filter engagement surface includes the multi-stage filter attachment members 4210a and 4310b extending from an outer surface of the filter cap 4200 (e.g., the neck portion) and disposed within 180 degrees of rotation on the outer surface. The multi-stage filter attachment members 4210a and 4310b are spaced axially and circumferentially apart from each other with respect to a centerline axis of the filter cartridge 4002 and the filter cap 4200 extending in a longitudinal direction.

The multi-stage filter attachment members 4210a-4210b form filter engagement surfaces that are non-congruent to the manifold engagement surfaces, e.g., the multi-stage manifold attachment members 356a, 356b. In use, the multi-stage filter attachment members 4210a-4210d provide surfaces that can engage with the pair of multi-stage manifold attachment members 356a, 356b, illustrated as attachment ramps, on an interior perimeter wall 359 of the distribution manifold 332 of FIGS. 25, 28 and 33. The multi-stage filter attachment members 4210a-4210b can be non-congruent to the manifold engagement surfaces of the multi-stage manifold attachment members 356a, 356b and yet be suitable for engaging with the manifold engagement surfaces of the multi-stage manifold attachment members 356a, 356b. In some embodiments, the shape and structure of the filter cartridge 4002 and/or the filter cap 4200 can be modified as suitable for the application. For example, in some embodiments the filter cap 4200 can be omitted and the multi-stage filter attachment members 4210a-4210b can be otherwise connected to the filter cartridge 4002.

The filter cap 4200 includes the pair of opposed multi-stage filter attachment members 4210a, 4210b, for example attachment ramps as illustrated in FIG. 42A. Furthermore, the multi-stage filter attachment members are disposed on the neck portion with at least one vent port also located on the neck portion. As seen in the embodiment in FIG. 41A, two vent ports (4219a and 4219b) are located in the neck portion. The vent ports 4219a and 4219b are generally radially opposed to each other and approximately orthogonal to the filter attachment members 4210a and 4210b. The vent ports allow for relief of pressure trapped in the filter cartridge before complete disengagement during the removal of the filter cartridge from the manifold.

The filter cap 4200 includes an indicium 4220. In some embodiments, the indicium 4220 can be a label, sticker, stamp, impression, or any other appropriate indicator that can be visible upon the filter cap 4200 or elsewhere on the filter cartridge 4002 or filter packaging. The indicium 4220 provides compatibility information that indicates the distribution manifolds 332 and/or appliances to which the filter cartridge 4002 can be engaged or that indicates a replaceable filter cartridge. The indicium 4220 can be an indicium selected from the group consisting of a model number and/or other indicium listed in TABLE 1.

Figures 43A, 43B:
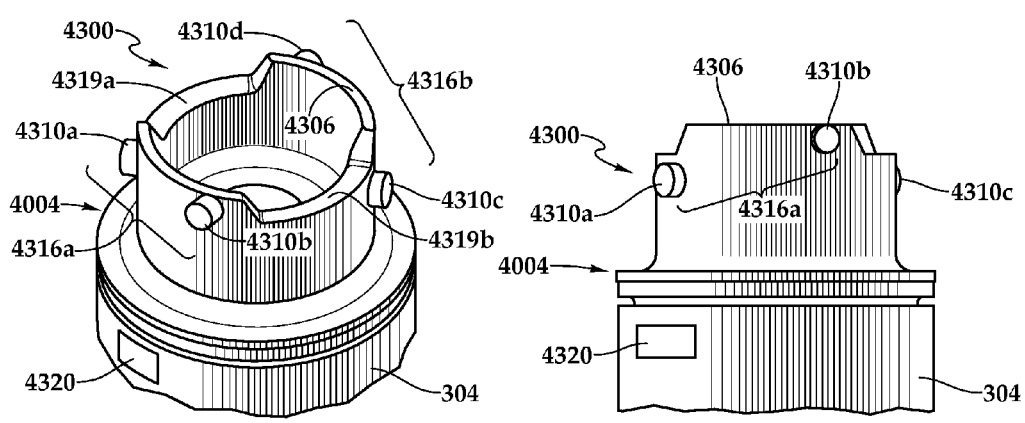
FIG. 43A is a fragmentary perspective view of an embodiment of the filter cartridge of FIG. 13 with an expanded view of another example filter cap.
FIG. 43B is a fragmentary side view of an embodiment of the filter cartridge of FIG. 13 with an expanded view of the filter cap of FIG. 43A.

FIGS. 43A and 43B are fragmentary perspective and side views of a filter cartridge 4004, which is another embodiment of the filter cartridge of FIG. 13 with an expanded view of another example filter cap 4300. In some embodiments, the filter cap 4300 can be used with the filter cartridge 4004 in place of the filter cap 302. In some embodiments, some or all of the features of the filter cap 302 not explicitly shown or discussed with respect to the filter cap 4300 may be included in the filter cap 4300 as well.

In some embodiments, the filter cap 4300 may be used with the filter cartridge 4004 to provide an engagement structure. In some embodiments, the filter cap 4300 may be constructed of a first polymer, such as polypropylene, having a specific quality such as, for example, strength or rigidity. Examples of suitable polymers include metallocene modified polypropylene or polyethylene polymers and copolymers as well as either high or low density polyethylene polymers. In some embodiments, the filter cap 4300 and the filter body 304 may be joined by, for example, an engageable thread or other joining techniques such as adhesives, heat welding, spin welding, ultrasonic welding and any other appropriate means for joining components. In some embodiments, the filter cap 4300 can be integrally formed with the filter body 304 such that the filter cap 4300 is an integral neck portion of the filter body 304.

The filter cap 4300 includes a collection of multi-stage filter attachment members 4310a-4310d. The multi-stage filter attachment members 4310a-4310d are formed as rounded or elliptical posts projecting radially outward from an attachment end 4306. The multi-stage filter attachment members 4310a and 4310b are arranged as a pair 4316a in relatively proximity to each other, and spaced apart from the multi-stage filter attachment members 4310c and 4310d which are arranged as a pair 4316b generally radially opposed to the pair 4316a across the filter cap 4300. In some embodiments, the multi-stage filter attachment members 4310a-4310d provide a replacement cartridge engagement surface. In the illustrated example, the filter engagement surface includes the pairs 4316a and 4316b extending from an outer surface of the filter cap 4300 (e.g., the neck portion) and disposed within 180 degrees of rotation on the outer surface. The pairs 4310a and 4310b are spaced axially and circumferentially apart from each other with respect to a centerline axis of the filter cartridge 4004 and the filter cap 4300 extending in a longitudinal direction.

In the pair 4316a, the multi-stage filter attachment member 4310a is arranged axially closer to the filter body than the multi-stage filter attachment member 4310b. In the pair 4316b, the multi-stage filter attachment member 4310c is arranged axially closer to the filter body than the multi-stage filter attachment member 4310d. The multi-stage filter attachment members 4310a-4310d form filter engagement surfaces that are non-congruent to the manifold engagement surfaces, e.g., the multi-stage manifold attachment members 356a, 356b. In use, the axially and radially offset relative arrangement of the multi-stage filter attachment members 4310a-4310d provide surfaces that can engage with the pair of multi-stage manifold attachment members 356a, 356b, illustrated as attachment ramps, on an interior perimeter wall 359 of the distribution manifold 332 of FIGS. 25, 28 and 33. The multi-stage filter attachment members 4310a-4310d can be non-congruent to the manifold engagement surfaces of the multi-stage manifold attachment members 356a, 356b and yet be suitable for engaging with the manifold engagement surfaces of the multi-stage manifold attachment members 356a, 356b. In some embodiments, the shape and structure of the filter cartridge 4004 and/or the filter cap 4300 can be modified as suitable for the application. For example, in some embodiments the filter cap 4300 can be omitted and the multi-stage filter attachment members 4310a-4310d can be otherwise connected to the filter cartridge 4004.

The multi-stage filter attachment members 4310a-4310d are formed as rounded or elliptical posts projecting radially outward from an attachment end 4306. Furthermore, the multi-stage filter attachment members are disposed on the neck portion with at least one vent port also located on the neck portion. As seen in the embodiment in FIG. 43A, two vent ports (4319a and 4319b) are located in the neck portion. The vent ports 4319a and 4319b are generally radially opposed to each other and between multi-stage filter attachment members 4310b and 4310d. The vent ports allow for relief of pressure trapped in the filter cartridge before complete disengagement during the removal of the filter cartridge from the manifold.

The filter cap 4300 includes an indicium 4320. In some embodiments, the indicium 4320 can be a label, sticker, stamp, impression, or any other appropriate indicator that can be visible upon the filter cap 4300 or elsewhere on the filter cartridge 4004. The indicium 4320 provides compatibility information that indicates the distribution manifolds 332 and/or appliances to which the filter cartridge 4004 can be engaged or that indicates a replaceable filter cartridge. The indicium 4320 can be an indicium selected from the group consisting of a model number and/or other indicium listed in TABLE 1.

FIGS. 44A and 44B are fragmentary perspective and side views of a filter cartridge 4006, which is another embodiment of the filter cartridge of FIG. 13 with an expanded view of another example filter cap 4400. In some embodiments, the filter cap 4400 can be used with the filter cartridge 4006 in place of the filter cap 302. In some embodiments, some or all of the features of the filter cap 302 not explicitly shown or discussed with respect to the filter cap 4400 may be included in the filter cap 4400 as well.

In some embodiments, the filter cap 4400 may be used with the filter cartridge 4006 to provide an engagement structure. In some embodiments, the filter cap 4400 may be constructed of a first polymer, such as polypropylene, having a specific quality such as, for example, strength or rigidity. Examples of suitable polymers include metallocene modified polypropylene or polyethylene polymers and copolymers as well as either high or low density polyethylene polymers. In some embodiments, the filter cap 4400 and the filter body 304 may be joined by, for example, an engageable thread or other joining techniques such as adhesives, heat welding, spin welding, ultrasonic welding and any other appropriate means for joining components. In some embodiments, the filter cap 4400 can be integrally formed with the filter body 304 such that the filter cap 4400 is an integral neck portion of the filter body 304.

The filter cap 4400 includes a pair 4416a of multi-stage filter attachment members 4410a, 4410b, and a pair 4416b (not shown) of multi-stage filter attachment members 4410c, 4410d, for example attachment ramps as illustrated in FIGS. 44A and 44B. In some embodiments, the multi-stage filter attachment members 4410a-4410b provide a replacement cartridge engagement surface. The multi-stage filter attachment members 4410a, 4410b are generally semi-elliptical (e.g., half circular) members that include a substantially flat portion 4412 extending from an attachment end 4406. In some embodiments, the members 4410a, 4410b may have topside geometries that are not rounded (e.g., rectangular, prismatic). The flat portions 4412 generally face the filter body, with the flat portions 4412 of the multi-stage filter attachment members 4410a and 4410c arranged substantially perpendicular relative to the axis of the filter body, and the flat portions 4412 of the multi-stage filter attachment members 4410b and 4410d arranged at an angle between perpendicular and parallel relative to the axis of the filter body (e.g., at a 30 degree angle, 45 degree angle, 60 degree angle). The multistage filter attachment members 4410*a* and 4410*c* are located relatively axially closer to the filter body than the multi-stage filter attachment members 4410*b* and 4410*d*. The multi-stage filter attachment member 4410*a* is arranged axially opposite the multi-stage filter attachment member 4410*c* (not shown). The multi-stage filter attachment member 4410*b* is arranged axially opposite the multi-stage filter attachment member 4410*d*.

In the illustrated example, the filter engagement surface includes the pairs 4416*a* and 4416*b* extending from an outer surface of the filter cap 4400 (e.g., the neck portion) and disposed within 180 degrees of rotation on the outer surface. The pairs 4410*a* and 4410*b* are spaced axially and circumferentially apart from each other with respect to a centerline axis of the filter cartridge and the filter cap 4400 extending in a longitudinal direction.

The multi-stage filter attachment members 4410*a*-4410*d* form filter engagement surfaces that are non-congruent to the manifold engagement surfaces, e.g., the multi-stage manifold attachment members 356*a*, 356*b*. In use, the axially and radially offset relative arrangement of the multi-stage filter attachment members 4410*a*-4410*d* provide surfaces that can engage with the pair of multi-stage manifold attachment members 356*a*, 356*b*, illustrated as attachment ramps, on an interior perimeter wall 359 of the distribution manifold 332 of FIGS. 25, 28 and 33. The multi-stage filter attachment members 4410*a*-4410*d* can be non-congruent to the manifold engagement surfaces of the multi-stage manifold attachment members 356*a*, 356*b* and yet be suitable for engaging with the manifold engagement surfaces of the multi-stage manifold attachment members 356*a*, 356*b*. In some embodiments, the shape and structure of the filter cartridge 4006 and/or the filter cap 4400 can be modified as suitable for the application. For example, in some embodiments the filter cap 4400 can be omitted and the multi-stage filter attachment members 4410*a*-4410*d* can be otherwise connected to the filter cartridge 4006.

The filter cap 4400 includes an indicium 4420. In some embodiments, the indicium 4420 can be a label, sticker, stamp, impression, or any other appropriate indicator that can be visible upon the filter cap 4400 or elsewhere on the filter cartridge 4006 or packaging. The indicium 4420 provides compatibility information that indicates the distribution manifolds 332 and/or appliances to which the filter cartridge 4006 can be engaged or that indicates a replaceable filter cartridge. The indicium 4420 can be an indicium selected from the group consisting of a model number and/or other indicium listed in TABLE 1.

FIGS. 45A and 45B are fragmentary perspective and side views of a filter cartridge 4008, which is another embodiment of the filter cartridge of FIG. 13 with an expanded view of another example filter cap 4500. In some embodiments, the filter cap 4500 can be used with the filter cartridge 4008 in place of the filter cap 302. In some embodiments, some or all of the features of the filter cap 302 not explicitly shown or discussed with respect to the filter cap 4500 may be included in the filter cap 4500 as well.

In some embodiments, the filter cap 4500 may be used with the filter cartridge 4008 to provide an engagement structure. In some embodiments, the filter cap 4500 may be constructed of a first polymer, such as polypropylene, having a specific quality such as, for example, strength or rigidity. Examples of suitable polymers include metallocene modified polypropylene or polyethylene polymers and copolymers as well as either high or low density polyethylene polymers. In some embodiments, the filter cap 4500 and the filter body 304 may be joined by, for example, an engageable thread or other joining techniques such as adhesives, heat welding, spin welding, ultrasonic welding and any other appropriate means for joining components. In some embodiments, the filter cap 4500 can be integrally formed with the filter body 304 such that the filter cap 4500 is an integral neck portion of the filter body 304.

The filter cap 4500 can include a pair of opposed and similarly configured multi-stage filter attachment members 4510*a*, 4510*b*, for example attachment ramps as illustrated in FIGS. 45A and 45B. In some embodiments, the multi-stage filter attachment members 4510*a*-4510*b* provide a replacement cartridge engagement surface. The multi-stage filter attachment members 4510*a*, 4510*b* include a first angled portion 4512*a* adjacent to a first horizontal portion 4514*a*, the first horizontal portion 4514*a* facing toward the filter body, a second angled portion 4516*a* adjacent to the first horizontal portion 4514*a*, a second horizontal portion 4518*a* facing toward the filter body, and a third angled portion 4519*a* adjacent to the second horizontal portion 4518*a*. The multi-stage filter attachment member 4510*b* can include a first angled portion 4512*b*, a first horizontal portion 4514*b*, a second angled portion 4516*b*, a second horizontal portion 4518*b* and a third angled portion 4519*b*.

In the illustrated example, the filter engagement surface includes the multi-stage filter attachment members 4510*a* and 4510*b* extending from an outer surface of the filter cap 4500 (e.g., the neck portion) and disposed generally opposed to each other on the outer surface. The multi-stage filter attachment members 4510*a* and 4510*b* are spaced axially and circumferentially apart from each other with respect to a centerline axis of the filter cartridge 4008 and the filter cap 4500 extending in a longitudinal direction.

The horizontal portions 4514*a*, 4514*b*, 4518*a*, and 4518*b* each include a collection of sprags 4522 oriented toward the filter body. The sprags 4522 form a generally sawtooth pattern along the otherwise generally horizontal portions 4514*a*, 4514*b*, 4518*a*, and 4518*b*. The sprags 4522 can each extend to a point, such that one, more, or all of the horizontal portions 4514*a*, 4514*b*, 4518*a*, and 4518*b* include substantially no continuous, horizontal surface. The multi-stage filter attachment members 4510*a*-4510*b* form filter engagement surfaces that are non-congruent to the manifold engagement surfaces, e.g., the multi-stage manifold attachment members 356*a*, 356*b*. In use, the configuration of the multi-stage filter attachment members 4510*a* and 4510*b* provide surfaces that can engage with the pair of multi-stage manifold attachment members 356*a*, 356*b*, illustrated as attachment ramps, on an interior perimeter wall 359 of the distribution manifold 332 of FIGS. 25, 28 and 33. The tips of the sprags 4522 can slidingly contact multi-stage manifold attachment members 356*a*, 356*b*. The multi-stage filter attachment members 4510*a*-4510*b* can be non-congruent to the manifold engagement surfaces of the multi-stage manifold attachment members 356*a*, 356*b* and yet be suitable for engaging with the manifold engagement surfaces of the multi-stage manifold attachment members 356*a*, 356*b*. In some embodiments, the shape and structure of the filter cartridge 4008 and/or the filter cap 4500 can be modified as suitable for the application. For example, in some embodiments the filter cap 4500 can be omitted and the multi-stage filter attachment members 4510*a*-4510*b* can be otherwise connected to the filter cartridge 4008.

The filter cap 4500 can include a pair of opposed and similarly configured multi-stage filter attachment members 4510*a*, 4510*b*, for example attachment ramps as illustrated in FIGS. 45A and 45B. that are disposed on the neck portion with at least one vent port also located on the neck portion. As seen in the embodiment in FIG. 45A, two vent ports (4530*a* and 4530b) are located in the neck portion. The vent ports 4530a and 4530b are generally radially opposed to each other. The vent ports allow for relief of pressure trapped in the filter cartridge before complete disengagement during the removal of the filter cartridge from the manifold.

The filter cap 4500 includes an indicium 4520. In some embodiments, the indicium 4520 can be a label, sticker, stamp, impression, or any other appropriate indicator that can be visible upon the filter cap 4500 or elsewhere on the filter cartridge 4008 or packaging. The indicium 4520 provides compatibility information that indicates the distribution manifolds 332 and/or appliances to which the filter cartridge 4008 can be engaged or that indicates a replaceable filter cartridge. The indicium 4520 can be an indicium selected from the group consisting of a model number and/or other indicium listed in TABLE 1.

FIGS. 46A and 46B are fragmentary perspective and side views of a filter cartridge 4010, which is another embodiment of the filter cartridge of FIG. 13 with an expanded view of another example filter cap 4600. In some embodiments, the filter cap 4600 can be used with the filter cartridge 300 in place of the filter cap 4010. In some embodiments, some or all of the features of the filter cap 302 not explicitly shown or discussed with respect to the filter cap 4600 may be included in the filter cap 4600 as well.

In some embodiments, the filter cap 4600 may be used with the filter cartridge 4010 to provide an engagement structure. In some embodiments, the filter cap 4600 may be constructed of a first polymer, such as polypropylene, having a specific quality such as, for example, strength or rigidity. Examples of suitable polymers include metallocene modified polypropylene or polyethylene polymers and copolymers as well as either high or low density polyethylene polymers. In some embodiments, the filter cap 4600 and the filter body 304 may be joined by, for example, an engageable thread or other joining techniques such as adhesives, heat welding, spin welding, ultrasonic welding and any other appropriate means for joining components. In some embodiments, the filter cap 4600 can be integrally formed with the filter body 304 such that the filter cap 4600 is an integral neck portion of the filter body 304.

The filter cap 4600 can include a pair of opposed and similarly configured multi-stage filter attachment members 4610a, 4610b, for example attachment ramps as illustrated in FIGS. 46A and 46B. In some embodiments, the multi-stage filter attachment members 4610a-4610b provide a replacement cartridge engagement surface. The multi-stage filter attachment members 4610a, 4610b include a first angled portion 4612a adjacent to a first horizontal portion 4614a, the first horizontal portion 4614a facing toward the filter body resembling a "hockey stick". The multi-stage filter attachment member 4610b can include a first angled portion 4612 and a first horizontal portion 4614b.

In the illustrated example, the filter engagement surface includes the multi-stage filter attachment members 4610a and 4610b extending from an outer surface of the filter cap 4600 (e.g., the neck portion) and disposed within 180 degrees of rotation on the outer surface. The multi-stage filter attachment members 4610a and 4610b are spaced axially and circumferentially apart from each other with respect to a centerline axis of the filter cartridge and the filter cap 4600 extending in a longitudinal direction.

The multi-stage filter attachment members 4610a-4610b form filter engagement surfaces that are non-congruent to the manifold engagement surfaces, e.g., the multi-stage manifold attachment members 356a, 356b. In use, the configuration of the multi-stage filter attachment members 4610a and 4610b provide surfaces that can engage with the pair of multi-stage manifold attachment members 356a, 356b, illustrated as attachment ramps, on an interior perimeter wall 359 of the distribution manifold 332 of FIGS. 25, 28 and 33. The multi-stage filter attachment members 4610a-4610b can be non-congruent to the manifold engagement surfaces of the multi-stage manifold attachment members 356a, 356b and yet be suitable for engaging with the manifold engagement surfaces of the multi-stage manifold attachment members 356a, 356b. In some embodiments, the shape and structure of the filter cartridge 4010 and/or the filter cap 4600 can be modified as suitable for the application. For example, in some embodiments the filter cap 4600 can be omitted and the multi-stage filter attachment members 4610a-4610b can be otherwise connected to the filter cartridge 4010.

The filter cap 4600 can include a pair of opposed and similarly configured multi-stage filter attachment members 4610a, 4610b, for example attachment ramps as illustrated in FIGS. 46A and 46B that are disposed on the neck portion with at least one vent port also located on the neck portion. As seen in the embodiment in FIG. 46A, two vent ports (4630a and 4630b) are located in the neck portion. The vent ports 4630a and 4630b are generally radially opposed to each other. The vent ports allow for relief of pressure trapped in the filter cartridge before complete disengagement during the removal of the filter cartridge from the manifold.

The filter cap 4600 includes an indicium 4620. In some embodiments, the indicium 4620 can be a label, sticker, stamp, impression, or any other appropriate indicator that can be visible upon the filter cap 4600 or elsewhere on the filter cartridge 4010 or packaging. The indicium 4620 provides compatibility information that indicates the distribution manifolds 332 and/or appliances to which the filter cartridge 4010 can be engaged or that indicates a replaceable filter cartridge. The indicium 4620 can be an indicium selected from the group consisting of a model number and/or other indicium listed in TABLE 1.

Figure 47:
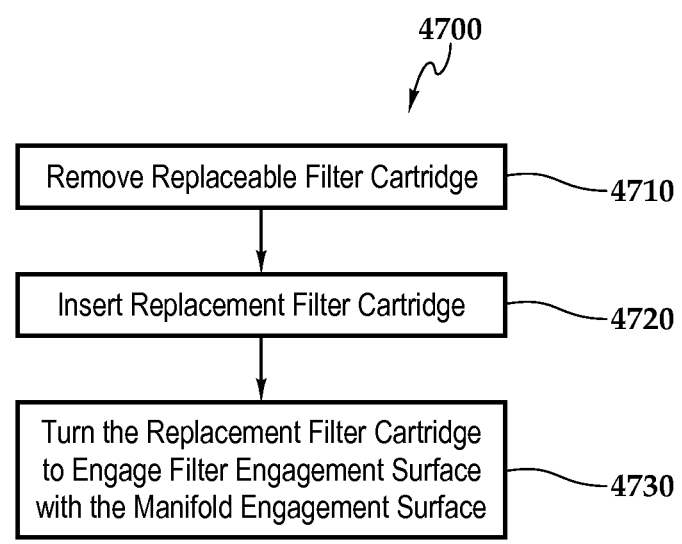
FIG. 47 is a flow diagram of an example process for replacing a filter cartridge.

FIG. 47 is a flow diagram of an example process 4700 for replacing a filter cartridge. In some implementations, the process 4700 can be used with the filter cartridges 4000, 4002, 4004, 4006, 4008, and/or 4010, the filter caps 4100, 4200, 4300, 4400, 4500, and/or 4600, and the distribution manifold 332 of FIGS. 1-46.

At step 4710, a replaceable filter cartridge is removed from a manifold assembly. The manifold assembly includes a manifold engagement mechanism having a manifold engagement surface with a first horizontal portion, a second horizontal portion, and an angled portion disposed between and joining the first horizontal portion to the second horizontal portion. For example, the filter cartridge 300 can be removed from the distribution manifold 332, which includes the attachment members 356a, 356b.

At step 4720, a replacement filter cartridge is inserted into the manifold assembly. The replacement filter cartridge includes a replacement cartridge engagement mechanism having a replacement cartridge engagement surface that is non-congruent to the manifold engagement surface. For example, the filter cap 4100, 4200, 4300, 4400, 4500, or 4600 include corresponding multi-stage filter attachment members that are configured and arranged to provide a replacement cartridge engagement mechanism that is non-congruent to the manifold members 356a, 356b.

At 4730, the replacement filter cartridge is turned to engage the filter engagement surface with the manifold engagement surface. In some implementations, the process 4700 can also include sliding the filter engagement surface against the second horizontal portion, sliding the filter engagement surface against the angled portion after sliding the filter engagement surface against the second horizontal portion, and sliding the filter engagement surface against the first horizontal portion after sliding the filter engagement surface against the angled portion. For example, any of the filter cartridges 4000, 4002, 4004, 4006, 4008, or 4010, configured with any of the filter caps 4100, 4200, 4300, 4400, 4500, or 4600, can be operatively connected to the distribution manifold 332 to form a filtration system similar to the filtration system 366, as discussed previously in the descriptions of FIGS. 31, 32 and 33.

Although a few implementations have been described in detail above, other modifications are possible. For example, in the logic flows depicted in the figures, steps may be provided, or steps may be eliminated, from the described flows, and other components may be added to, or removed from, the described systems. Components and features from different filter cartridges may be combined or modified as suitable for a particular application. For example, with respect to the filter cartridge 4002, the filter attachment member 4210a can be omitted and replaced with the filter attachment member 4310b positioned substantially opposite the filter attachment member 4210b. Accordingly, other implementations are within the scope of the following claims.

What is claimed is:

1. A filter replacement kit comprising:
    a replacement filter cartridge comprising:
        a filter body;
        a filter media disposed within the filter body;
        a neck portion having a fluid inlet and a fluid outlet; and
        a cartridge engagement mechanism on the neck portion for engaging a manifold assembly, the cartridge engagement mechanism comprising at least one filter engagement surface; and
    compatibility indicia, wherein the compatibility indicia indicates that the replacement filter cartridge is a replacement for at least one replaceable filter cartridge, wherein the at least one replaceable filter cartridge includes a replaceable filter engagement mechanism having a replaceable filter engagement surface with a first horizontal portion, a second horizontal portion, and an angled portion disposed between and joining the first horizontal portion to the second horizontal portion, and wherein the filter engagement surface is non-congruent to the replaceable filter engagement surface.

2. The filter replacement kit of claim 1, wherein the filter engagement surface does not comprise a first filter horizontal portion, a second filter horizontal portion and an angled filter portion disposed between and joining the first filter horizontal portion to the second filter horizontal portion.

3. The filter replacement kit of claim 1, wherein the cartridge engagement mechanism comprises first and second pairs of filter attachment members, wherein the first pair of filter attachment members comprises a first filter attachment member that includes a first substantially flat portion angled substantially perpendicular relative to a centerline axis of the filter body and a second filter attachment member that includes a second substantially flat portion arranged at an angle between perpendicular and parallel relative to the centerline axis of the filter body, wherein the first and second filter attachment members are spaced axially and circumferentially apart from each other with respect to the centerline axis, and wherein the first and second substantially flat portions define at least part of the filter engagement surface.

4. The filter replacement kit of claim 1, wherein the cartridge engagement mechanism comprises first and second pairs of filter attachment members, wherein the first pair of filter attachment members comprises a first filter attachment member that includes a first substantially flat portion angled substantially perpendicular relative to a centerline axis of the filter body and a second filter attachment member that includes a second substantially flat portion arranged at an angle between perpendicular and parallel relative to the centerline axis of the filter body, wherein the first and second filter attachment members are spaced axially and circumferentially apart from each other with respect to the centerline axis, wherein the second pair of filter attachment members comprises a third filter attachment member that includes a third substantially flat portion angled substantially perpendicular relative to the centerline axis of the filter body and a fourth filter attachment member that includes a fourth substantially flat portion arranged at an angle between perpendicular and parallel relative to the centerline axis of the filter body, wherein the third and fourth filter attachment members are spaced axially and circumferentially apart from each other with respect to the centerline axis, and wherein the first, second, third, and fourth substantially flat portions define at least part of the filter engagement surface.

5. The filter replacement kit of claim 1, wherein the at least one filter engagement surface comprises first and second filter engagement surfaces on generally opposite sides of the neck portion, wherein the first filter engagement surface includes no more than one horizontal portion.

6. The filter replacement kit of claim 1, wherein the at least one filter engagement surface comprises first and second filter engagement surfaces on generally opposite sides of the neck portion, wherein the first filter engagement surface comprises no more than one horizontal portion and an angled portion.

7. The filter replacement kit of claim 1, wherein the at least one filter engagement surface comprises an arcuate portion.

8. The filter replacement kit of claim 7, wherein the at least one filter engagement surface comprises two separated arcuate surfaces extending from an outer surface of the neck portion and disposed within 180 degrees of rotation on the outer surface, wherein the two arcuate surfaces are spaced axially and circumferentially apart from each other with respect to a centerline axis of the filter cartridge extending in a longitudinal direction.

9. The filter replacement kit of claim 8, wherein the at least one filter engagement surface comprises two posts.

10. The filter replacement kit of claim 9, wherein the at least one filter engagement surface comprises two arcs.

11. The filter replacement kit of claim 1, wherein the at least one filter engagement surface comprise two separated tabs on an outer surface of the neck portion disposed within 180 degrees of rotation on the outer surface and the two separated tabs are spaced axially and circumferentially apart from each other with respect to a centerline axis of the filter cartridge extending in a longitudinal direction.

12. The filter replacement kit of claim 1, wherein the at least one replaceable filter cartridge comprises a replaceable filter cartridge having a model number selected from the group consisting of EPTWFU01, EWF02, MSWF, 60218743, 9000 674655, 4US-MAXL-F01 & 4US-MAXS-F01, 4US-RO-POST, 4US-RO-POSTH, 4WH-QCTO-F01, 4WH-QS-F01, and 4WH-QSS-F01H.

13. A method of replacing a filter cartridge using the filter replacement kit of claim 1, the method comprising:
    removing a replaceable filter cartridge from a manifold assembly, wherein the manifold assembly comprises a manifold engagement mechanism having a manifold engagement surface with a first horizontal portion, a second horizontal portion, and an angled portion disposed between and joining the first horizontal portion to the second horizontal portion;

inserting the replacement filter cartridge of the filter replacement kit into the manifold assembly; and turning the replacement filter cartridge to engage the filter engagement surface with the manifold engagement surface.

14. The method of claim 13, wherein the replaceable filter cartridge comprises a replaceable filter engagement mechanism with a replaceable filter engagement surface that is congruent to the manifold engagement surface.

15. The method of claim 13, and further comprising:

sliding the filter engagement surface against the second horizontal portion;

sliding the filter engagement surface against the angled portion after sliding the filter engagement surface against the second horizontal portion; and sliding the filter engagement surface against the first horizontal portion after sliding the filter engagement surface against the angled portion.

16. A system comprising:

a manifold assembly comprising a manifold engagement mechanism comprising a manifold engagement surface with a first horizontal portion, a second horizontal portion, and an angled portion disposed between and joining the first horizontal portion to the second horizontal portion; and the filter replacement kit of claim 1, wherein the replacement filter cartridge is attached to the manifold assembly with the filter engagement surface engaged with the manifold engagement surface and wherein the filter engagement surface is non-congruent to the manifold engagement surface.

17. The system of claim 16, wherein the filter engagement surface does not comprise a first filter horizontal portion, a second filter horizontal portion and an angled filter portion disposed between and joining the first filter horizontal portion to the second filter horizontal portion.

18. The system of claim 16, wherein the cartridge engagement mechanism comprises first and second pairs of filter attachment members, wherein the first pair of filter attachment members comprises a first filter attachment member that includes a first substantially flat portion angled substantially perpendicular relative to a centerline axis of the filter body and a second filter attachment member that includes a second substantially flat portion arranged at an angle between perpendicular and parallel relative to the centerline axis of the filter body, wherein the first and second filter attachment members are spaced axially and circumferentially apart from each other with respect to the centerline axis, and wherein the first and second substantially flat portions define at least part of the filter engagement surface.

19. The system of claim 16, wherein the at least one filter engagement surface comprises first and second filter engagement surfaces on generally opposite sides of the neck portion, wherein the first filter engagement surface includes no more than one horizontal portion.

20. The system of claim 16, wherein the at least one filter engagement surface comprises first and second filter engagement surfaces on generally opposite sides of the neck portion, wherein the first filter engagement surface comprises no more than one horizontal portion and an angled portion.

21. The system of claim 16, wherein the at least one filter engagement surface comprises two posts.

22. The system of claim 16, wherein the at least one filter engagement surface comprise two separated tabs on an outer surface of the neck portion disposed within 180 degrees of rotation on the outer surface and the two separated tabs are spaced axially and circumferentially apart from each other with respect to a centerline axis of the filter cartridge extending in a longitudinal direction.

23. The system of claim 16, wherein the at least one manifold assembly comprises a manifold assembly having a model identifier selected from the group consisting of Pure-Source Ultra II-M, PureSource Ultra II-U, PureAdvantage Ultra-M, PureAdvantage Ultra-U, GE MSWF, 60820860, 9000 225170, 9000 705475, 9000 777508, 4US-MAXL-S01, 4US-MAXS-S01, 4US-RO-S01, 4US-RO-S01H, 4WH-Q Series, 4WH-QS-S01, 4WH-QCTO-S01, and 4WH-QSS-S01H.

\* \* \* \* \*